United States Patent
Kimura

(10) Patent No.: US 9,143,885 B2
(45) Date of Patent: Sep. 22, 2015

(54) COMMUNICATION DEVICE, COMMUNICATION CONTROL METHOD, AND COMMUNICATION SYSTEM

(75) Inventor: Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 13/819,353

(22) PCT Filed: Aug. 10, 2011

(86) PCT No.: PCT/JP2011/068288
§ 371 (c)(1),
(2), (4) Date: Feb. 27, 2013

(87) PCT Pub. No.: WO2012/046503
PCT Pub. Date: Apr. 12, 2012

(65) Prior Publication Data
US 2013/0163520 A1    Jun. 27, 2013

(30) Foreign Application Priority Data
Oct. 4, 2010   (JP) ................................ 2010-225078

(51) Int. Cl.
*H04W 4/00*   (2009.01)
*H04W 28/02*   (2009.01)
(Continued)

(52) U.S. Cl.
CPC ............ *H04W 4/00* (2013.01); *H04W 28/0215* (2013.01); *H04W 28/0289* (2013.01); *H04W 40/02* (2013.01); *H04L 45/125* (2013.01); *H04L 47/24* (2013.01); *H04W 4/005* (2013.01)

(58) Field of Classification Search
CPC ... H04W 28/0215; H04W 40/02; H04W 4/00; H04W 28/0289; H04W 48/02; H04W 4/005; H04L 69/161; H04L 67/12; H04L 45/125; H04L 45/308

USPC ............... 370/328, 329, 444, 450, 515, 392; 709/201; 455/456.1, 411; 725/110
See application file for complete search history.

(56) References Cited

U.S. PATENT DOCUMENTS

2010/0142538 A1* 6/2010 Glover et al. ................. 370/400
2011/0235558 A1* 9/2011 Diachina et al. .............. 370/310
(Continued)

FOREIGN PATENT DOCUMENTS

| JP | 2006-332755 A | 12/2006 |
| JP | 2007-151013 A | 6/2007 |

(Continued)

OTHER PUBLICATIONS

Office Action issued May 13, 2014 in Japanese Patent Application No. 2010-225078.
(Continued)

*Primary Examiner* — Charles C Jiang
*Assistant Examiner* — Rose Clark
(74) *Attorney, Agent, or Firm* — Sony Corporation

(57) ABSTRACT

Provided is a communication device within a communication network including a plurality of communication nodes, including: a reception unit that receives a data packet transmitted from a terminal device or transmitted to the terminal device; a communication control unit that selects a forwarding destination node of the data packet from a plurality of forwarding destination node candidates when the terminal device is a machine-type communication (MTC) terminal; and a transmission unit that transmits the data packet to the forwarding destination node selected by the communication control unit.

12 Claims, 29 Drawing Sheets

(51) Int. Cl.
H04W 40/02 (2009.01)
H04L 12/851 (2013.01)
H04L 12/729 (2013.01)

(56) References Cited

U.S. PATENT DOCUMENTS

| | | | |
|---|---|---|---|
| 2011/0252235 A1* | 10/2011 | Dolan et al. | 713/168 |
| 2011/0307932 A1* | 12/2011 | Fan et al. | 725/110 |
| 2012/0106391 A1* | 5/2012 | van Loon et al. | 370/252 |
| 2012/0140632 A1* | 6/2012 | Norp et al. | 370/235 |
| 2012/0147752 A1* | 6/2012 | Ashwood-Smith et al. | 370/237 |
| 2012/0213185 A1* | 8/2012 | Frid | 370/329 |
| 2013/0128777 A1* | 5/2013 | Garcia Azorero | 370/259 |

FOREIGN PATENT DOCUMENTS

| | | |
|---|---|---|
| JP | 2007-156779 A | 6/2007 |
| JP | 2009-130657 A | 6/2009 |

OTHER PUBLICATIONS

U.S. Appl. No. 13/820,162, filed Mar. 1, 2013, Kimura.

* cited by examiner

| AP CLASS | TERMINAL ID (TWO LOWER-ORDER BITS) | FORWARDING DESTINATION NODE |
|---|---|---|
| C1 (LOW DELAY RECOMMENDATION) | 00 | N1 |
| | 01 | N2 |
| | 10 | N3 |
| | 11 | N4 |
| C2 | — | N5 |
| C3 | — | N6 |

FORWARDING DESTINATION DATA

| TERMINAL CLASS | FORWARDING DESTINATION NODE |
|---|---|
| T1 (Security) | N1 |
| T2 (Payment) | N2 |
| T3 (Health) | N3 |
| T4 (Metering) | N4 |

FORWARDING DESTINATION DATA

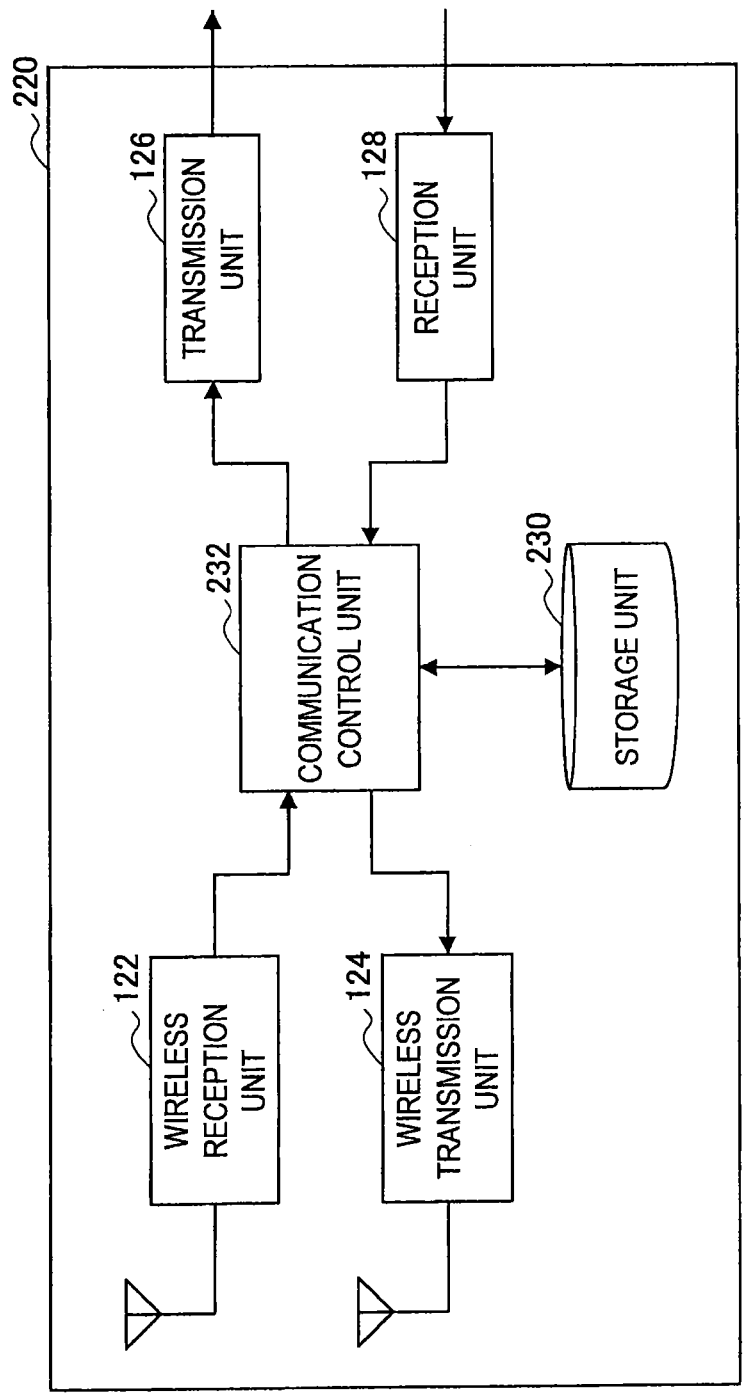

| AP CLASS | INTERMEDIATE NODE |
|---|---|
| C1 | M1 |
| C2 | M2 |
| C3 | M3 |

INTERMEDIATE NODE DATA

| TERMINAL CLASS | INTERMEDIATE NODE |
|---|---|
| T1 (Security) | M1 |
| T2 (Payment) | M2 |
| T3 (Health) | M3 |
| T4 (Metering) | M4 |

INTERMEDIATE NODE DATA

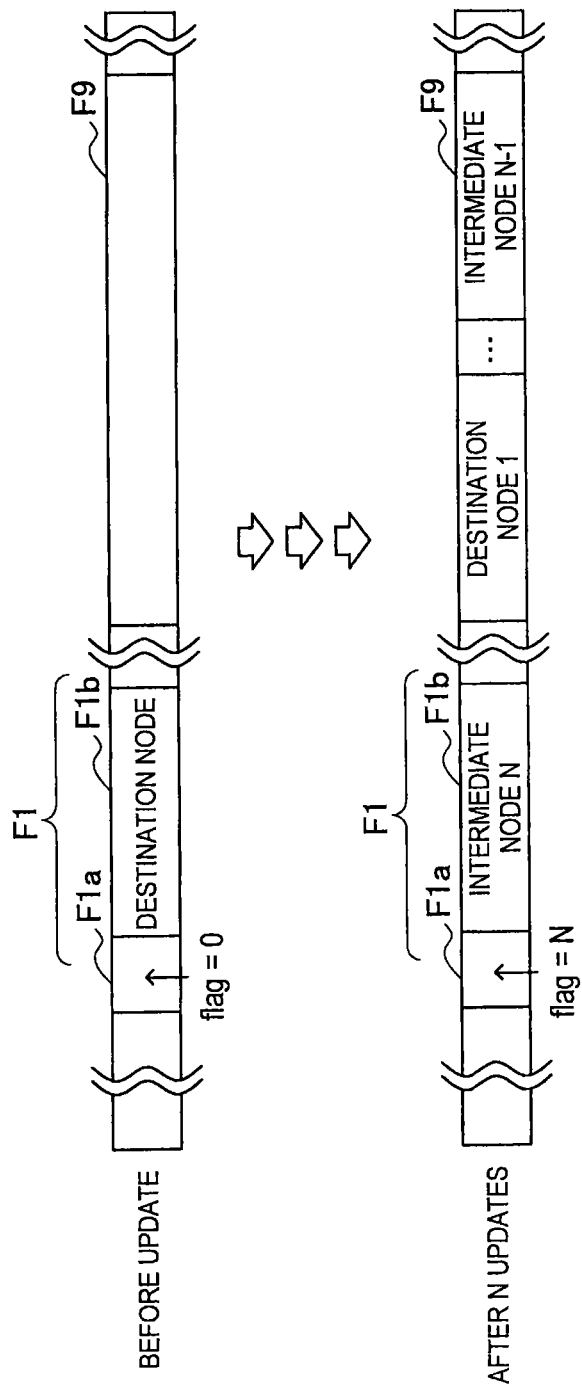

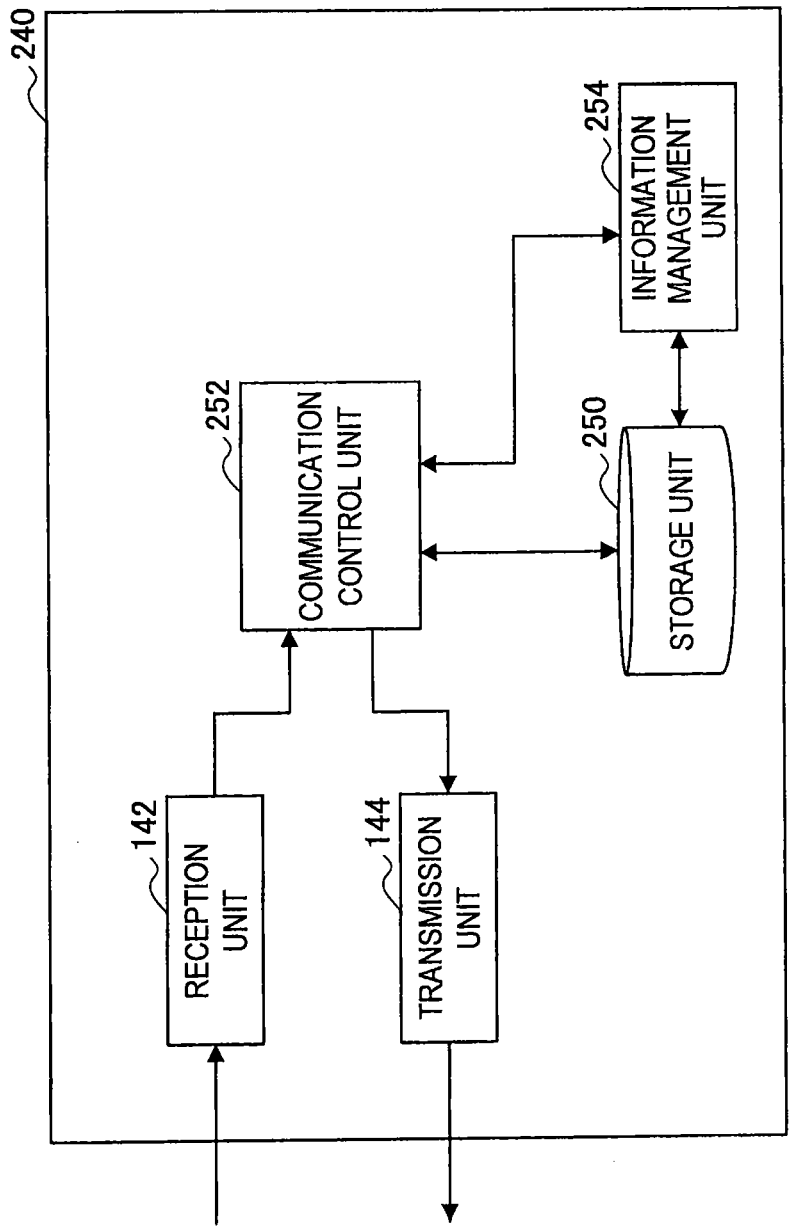

| AP CLASS | TERMINAL CLASS | PROVIDER | DESTINATION NODE |
|---|---|---|---|
| C1 | T3 | J01 | D1 |
| | | J02 | D2 |
| | T4 | J01 | D1 |
| | | J02 | D2 |
| C2 | T3 | J01 | D3 |
| | T4 | J02 | D4 |
| C3 | T1 | J01 | D5 |
| | | J03 | D6 |

DESTINATION NODE DATA

| PROVIDER | DESTINATION NODE | AP CLASS | TERMINAL CLASS | SCHEDULE | UPDATE DIVISION |
|---|---|---|---|---|---|
| J01 | D1 | C1 | T3 | every day | ADDITION |
| | | | T4 | every day | ADDITION |
| | D3 | C2 | T3 | every day | ADDITION |
| | D5 | C3 | T1 | every week | ADDITION |

UPDATE DATA

COMMUNICATION DEVICE, COMMUNICATION CONTROL METHOD, AND COMMUNICATION SYSTEM

TECHNICAL FIELD

The present disclosure relates to a communication device, a communication control method, and a communication system.

BACKGROUND ART

Recently, a form of communication referred to as machine-type communication (MTC) communication or machine-to-machine (M2M) communication in which a terminal device connected to a communication network independently performs communication without involving human intervention has been widely used. For example, a household gas meter is used as an MTC terminal and the remaining amount of gas is periodically transmitted from the meter to a server of a provider, so that the provider can recognize an amount of gas used in each household without requiring an inspector to perform a meter reading operation. In addition, the MTC communication, for example, can be used for various purposes such as transmission of an inventory quantity from a vending machine, transmission of the remaining amount of toner from a copier, transportation management in the transportation industry, and monitoring for security. The use of the MTC communication is also expected to expand in the future.

When the use of the MTC communication becomes widespread, the number of terminals to be accommodated by a communication network significantly increases. As a result, congestion of traffic within the communication network occurs and a communication failure or deterioration of quality of service (QoS) is likely to be problematic.

The following Patent Literature 1 proposes technology for monitoring a state of a communication node in a mobile communication network and changing a forwarding path of a signal from a terminal when congestion or abnormality has been detected.

CITATION LIST

Patent Literature

Patent Literature 1: JP 2009-130657A

SUMMARY OF INVENTION

Technical Problem

However, the technology disclosed in the above-described Patent Literature 1 is intended to reduce an influence of congestion when the congestion is already occurring, and is not intended to avoid the occurrence of congestion itself.

Here, considering the above-described purposes of the MTC communication, the MTC communication contains a risk of concentration of data transmission in a specific time and a specific region. However, because the MTC communication is usually systematically performed, the MTC communication is different from communication from a terminal used by a human and it is sufficiently possible to predict a risk of concentration of data transmission in the MTC communication. In addition, the case in which a low delay is strictly necessary as in voice communication, real-time streaming, and the like is comparatively less in the MTC communication. Accordingly, it is estimated that it is possible to avoid or mitigate the congestion of traffic in the MTC communication by systematically and smoothly controlling a communication path of the MTC communication to a certain extent.

It is desirable to provide a novel and improved mechanism capable of avoiding or mitigating congestion of traffic in MTC communication.

Solution to Problem

According to an embodiment of the present disclosure, there is provided a communication device within a communication network including a plurality of communication nodes including a reception unit that receives a data packet transmitted from a terminal device or transmitted to the terminal device, a communication control unit that selects a forwarding destination node of the data packet from a plurality of forwarding destination node candidates when the terminal device is a machine-type communication (MTC) terminal, and a transmission unit that transmits the data packet to the forwarding destination node selected by the communication control unit.

Further, the communication control unit may select the forwarding destination node of the data packet based on control information within the data packet.

Further, the communication device may further include a storage unit that stores forwarding destination data in which classification of data packets is associated with forwarding destination nodes. The communication control unit classifies the data packet according to the control information, and selects a forwarding destination node associated with classification of the data packet in the forwarding destination data as the forwarding destination node of the data packet.

Further, the control information may include a terminal identifier (ID), a class, or a group of the terminal device or an application ID or a class of an application relating to the data packet.

Further, the communication control unit may classify each data packet according to the control information, and selects a forwarding destination node of each data packet so that forwarding destinations of data packets belonging to the same classification are distributed to a plurality of forwarding destination nodes.

Further, the communication control unit may select the forwarding destination node of the data packet from the plurality of forwarding destination node candidates regardless of a routing metric relating to a path to a destination node of the data packet.

Further, the communication control unit may insert intermediate node designation information designating an intermediate node different from a destination node on a path to the destination node of the data packet into a destination field of the data packet.

Further, the communication control unit may transcribe information described in the destination field to another field upon receipt of the data packet.

Further, the communication control unit may add a flag indicating that the destination field is changed to the data packet.

Further, the communication network may be a core network of a cellular communication system.

Further, according to another embodiment of the present disclosure, there is provided a communication control method for use in a communication device within a communication network including a plurality of communication nodes including receiving a data packet transmitted from a terminal device or transmitted to the terminal device, selecting a forwarding destination node of the data packet from a plurality of forwarding destination node candidates when the terminal device is an MTC terminal, and transmitting the data packet to the selected forwarding destination node.

Further, according to another embodiment of the present disclosure, there is provided a communication system including a communication device including a reception unit that receives a data packet transmitted from a terminal device or transmitted to the terminal device, a communication control unit that selects a forwarding destination node of the data packet from a plurality of forwarding destination node candidates when the terminal device is an MTC terminal, and a transmission unit that transmits the data packet to the forwarding destination node selected by the communication control unit, and a plurality of communication nodes that are the forwarding destination node candidates.

Further, according to another embodiment of the present disclosure, there is provided a communication device within a communication network including a plurality of communication nodes including a reception unit that receives a data packet transmitted from a terminal device or transmitted to the terminal device, a transmission unit that transmits the data packet to a communication node that selects a forwarding destination node of the data packet from a plurality of forwarding destination node candidates when the terminal device is an MTC terminal, and a communication control unit that inserts control information for use in classification of the data packet by the communication node for the selection of the forwarding destination node into the data packet.

Advantageous Effects of Invention

As described above, in accordance with the technology of the present disclosure, congestion of traffic can be avoided or mitigated in MTC communication.

BRIEF DESCRIPTION OF DRAWINGS

FIG. 8A is an explanatory diagram illustrating a first example of forwarding destination data.

FIG. 8B is an explanatory diagram illustrating a second example of forwarding destination data.

FIG. 13 is a block diagram illustrating an example of a configuration of a base station in accordance with the second embodiment.

FIG. 14A is an explanatory diagram illustrating a first example of intermediate node data.

FIG. 14B is an explanatory diagram illustrating a second example of intermediate node data.

FIG. 15E is an explanatory diagram illustrating a fifth example of a destination field update process in accordance with the second embodiment.

FIG. 17 is a block diagram illustrating an example of a configuration of an intermediate node in accordance with the second embodiment.

FIG. 18 is an explanatory diagram illustrating an example of destination node data.

FIG. 22 is an explanatory diagram illustrating an example of update data.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, "modes for carrying out the present invention" will be described in the following order.

1. Description of First Embodiment
1-1. Outline of System
1-2. Terminal Device
1-3. Base Station
1-4. Forwarding Node
1-5. Summary of First Embodiment
1-6. Application Example
2. Description of Second Embodiment
2-1. Outline of System
2-2. Terminal Device
2-3. Base Station
2-4. Intermediate Node
2-5. Example of Communication Path
2-6. Information Management Server
2-7. Management of Discontinuous Reception (DRX)
2-8. Summary of Second Embodiment
2-9. Application Example
<1. Description of First Embodiment>
[1-1. Outline of System]

Figure 1:
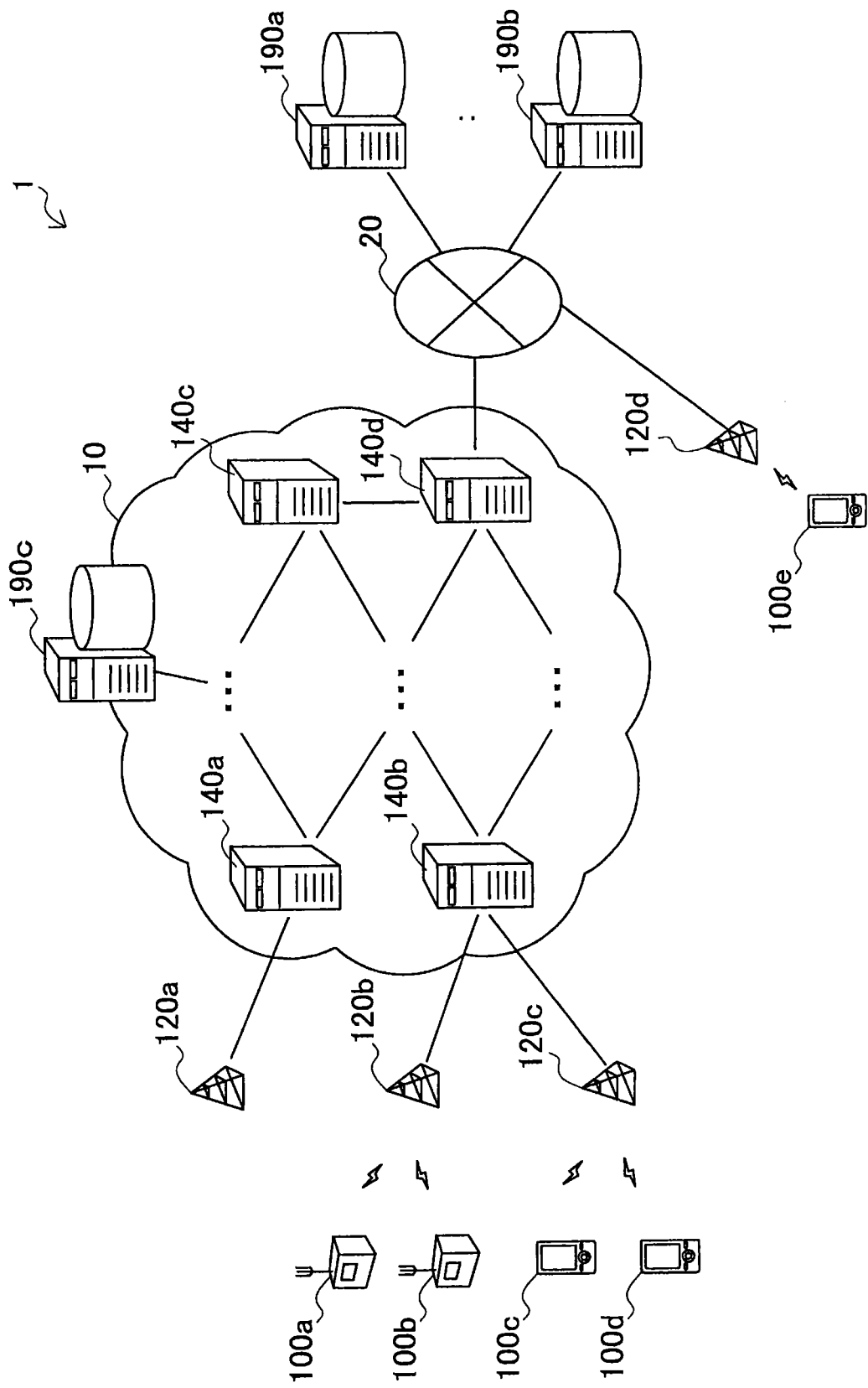
FIG. 1 is a schematic diagram illustrating an outline of a communication system in accordance with a first embodiment.

First, the first embodiment will be described using FIGS. 1 to 9. FIG. 1 is a schematic diagram illustrating an outline of a communication system 1 in accordance with the first embodiment. Referring to FIG. 1, the communication system 1 includes a plurality of terminal devices 100a to 100e, a plurality of base stations 120a to 120d, a plurality of communication devices 140a to 140d, and a plurality of application (AP) servers 190a to 190c. The plurality of communication devices 140a to 140d form a core network 10 in the communication system 1. The base station 120d and the AP servers 190a and 190b are connected to a network 20.

In this specification, when it is not necessary to distinguish the terminal devices 100a to 100e from one another, they are collectively referred to as a terminal device 100. The same is also true for a base station 120 (120a to 120d), a communication device 140 (140a to 140d), and an AP server 190 (190a to 190c).

The terminal device 100 is a wireless communication device that operates as an MTC terminal. Each terminal device 100 transmits and receives a radio signal to and from the base station 120 that provides a wireless communication service to a cell to which the terminal device 100 belongs. For example, the terminal device 100 generates AP data such as an amount of used gas or an inventory quantity of a vending machine, and transmits a data packet including the generated AP data to the base station 120. The data packet transmitted from the terminal device 100 to the base station 120 is ultimately delivered to a desired AP server 190 via several communication nodes.

The base station 120, for example, is a communication node that provides the wireless communication service within a cell extending around its own device according to a cellular communication scheme represented by long term evolution (LTE), LTE-Advanced, or the like. The base station 120, for example, receives a data packet including the AP data generated by the terminal device 100, and forwards the received data packet to the communication device 140 of the core network 10. In addition, the base station 120 receives a data packet addressed to the terminal device 100 forwarded via the core network 10, and forwards the received data packet to the destination terminal device 100.

In the example of FIG. 1, the base stations 120a to 120c are so-called macrocell base stations directly connected to the core network 10. On the other hand, the base station 120d is a femtocell base station (also referred to as home eNB (HeNB) in LTE) connected to the core network 10 via the network 20. These base stations 120 may also provide the wireless communication service to a general user terminal as well as an MTC terminal like the terminal device 100.

The communication device 140 is a communication node that forms the core network 10. Each communication device 140, for example, may be a radio network controller (RNC), a mobility management entity (MME), a home subscriber server (HSS), a serving GPRS support node (SGSN), a gateway GPRS support node (GGSN), or the like. In addition, each communication device 140, for example, may be a network device such as a switch or router connected between the communication nodes. The communication device 140, for example, receives a data packet transmitted from the terminal device 100 or transmitted to the terminal device 100, and sequentially forwards the received data packet so that the received data packet is delivered to a destination AP server 190.

Among the communication devices 140 illustrated in FIG. 1, for example, the communication device 140d is the GGSN having a function of a so-called gateway, and is located in a boundary between the core network 10 and the network 20. The network 20, for example, may be an Internet protocol (IP) network such as the Internet, or may be a non-IP network such as an asynchronous transfer mode (ATM) network.

The AP server 190, for example, is a server device having an AP function such as planning for charging of a gas fee or delivery of products for a vending machine. A server device using AP data transmitted from the MTC terminal is also referred to as an MTC server. The AP server 190 may be connected to the network 20 or may be located within the core network 10. In the example of FIG. 1, the AP servers 190a and 190b are connected to the network 20, and the AP server 190c is located within the core network 10. The AP server 190c may be implemented on physically the same device as a communication node that forms the core network 10.

The AP server 190, for example, ultimately receives a data packet transmitted from the terminal device 100. The AP server 190 executes the AP function as described in the above example by acquiring the AP data included in the received data packet. In addition, the AP server 190 may provide a user with a user interface for accepting an input of a setting relating to the MTC terminal. The setting relating to the MTC terminal, for example, can include a setting relating to a schedule of MTC communication between the AP server 190 and the terminal device 100.

When there are a large number of MTC terminals in the communication system 1 illustrated in FIG. 1, data packets transmitted from the MTC terminals are likely to cause congestion on a communication path to the destination AP server 190. In particular, when an AP necessary to collect periodic data is introduced, data packets can be simultaneously transmitted from the terminal devices 100 in a specific time or a specific region. However, because MTC communication is systematically performed, congestion by the MTC communication can be avoided before the congestion occurs. In addition, when the purpose of the MTC communication is data collection, the data packet may not necessarily be delivered to the AP server 190 at a maximum rate. In this embodiment, the occurrence of congestion of traffic in the MTC communication is avoided or mitigated by adopting a configuration of each device described from the next section.

In this specification, it should be noted that the term "communication node" or "communication device" can be any of the terminal device 100, the base station 120, the communication device 140, and the AP server 190 illustrated in FIG. 1 when no particular reference sign is attached.

[1-2. Terminal Device]

(1) Configuration Example of Device

Figure 2:
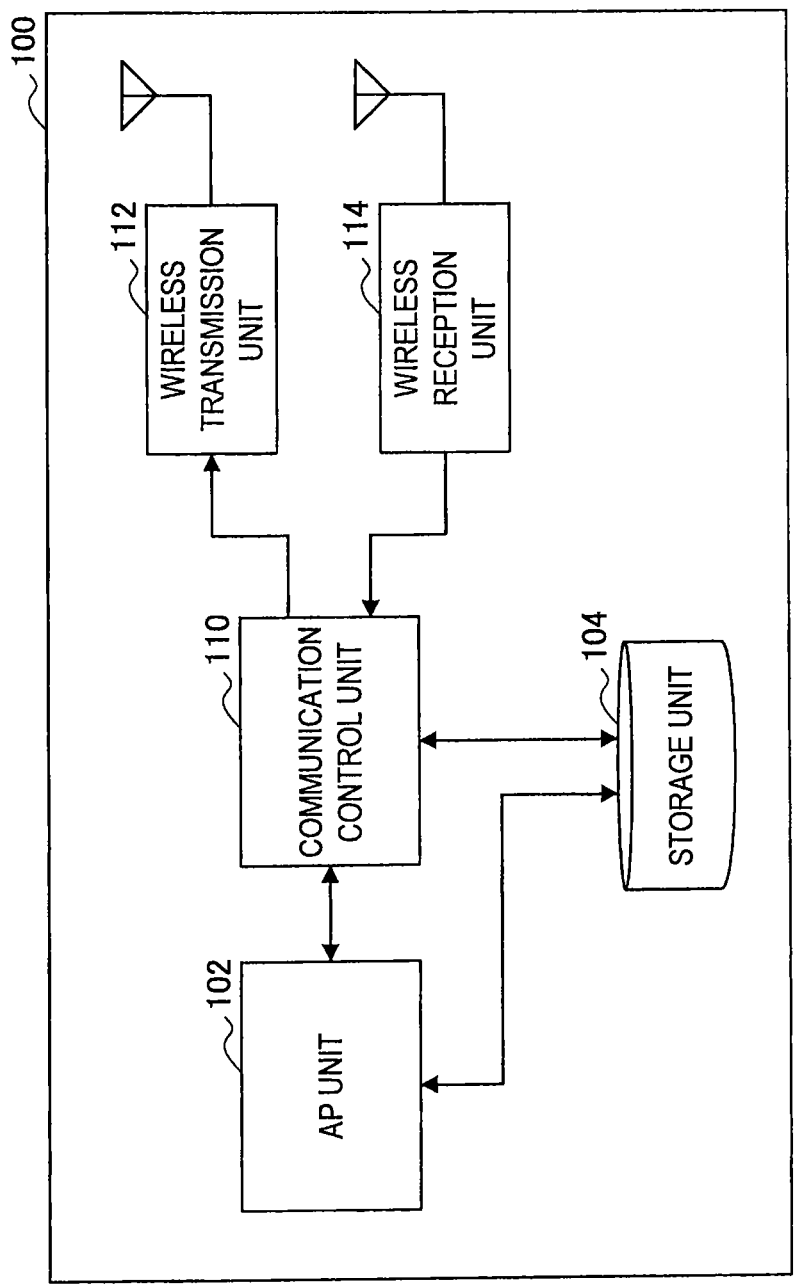
FIG. 2 is a block diagram illustrating an example of a configuration of a terminal device in accordance with the first embodiment.

FIG. 2 is a block diagram illustrating an example of a configuration of the terminal device 100 in accordance with this embodiment. Referring to FIG. 2, the terminal device 100 includes an AP unit 102, a storage unit 104, a communication control unit 110, a wireless transmission unit 112, and a wireless reception unit 114.

The AP unit 102 generates AP data to be transmitted to the AP server 190, and outputs the generated AP data to the communication control unit 110. The AP data generated by the AP unit 102, for example, can include an arbitrary type of data such as an amount of used gas, an inventory quantity of a vending machine, the remaining amount of toner of a copier, or position data for transport management according to a purpose of an AP. The generation of AP data, for example, may be periodically performed at a preset time or frequency. Alternatively, the generation of the AP data may be performed using a predetermined event (for example, a decrease of more than a given quantity in an inventory quantity) as a trigger.

The storage unit 104 stores programs and data for processing by the AP unit 102 and the communication control unit 110 using a storage medium such as a hard disk or a semiconductor memory. In addition, the storage unit 104 stores data serving as a base for the generation of the AP data by the AP unit 102. In addition, the storage unit 104 pre-stores at least part of control information inserted into a data packet as will be described later.

When the AP data to be transmitted to the AP server 190 is input from the AP unit 102, the communication control unit 110 generates a data packet including the AP data. The communication control unit 110 causes the generated data packet to be transmitted from the wireless transmission unit 112. In addition, when a data packet is received by the wireless reception unit 114, the communication control unit 110 acquires AP data included in the data packet and outputs the acquired AP data to the AP unit 102.

The wireless transmission unit 112 and the wireless reception unit 114 have an antenna and a radio frequency (RF) circuit. The wireless transmission unit 112 transmits a data packet generated by the communication control unit 110 as a radio signal on an air interface to the base station 120. In addition, the wireless reception unit 114 receives a data packet transmitted from the base station 120 as a radio signal on the air interface, and outputs the received data packet to the communication control unit 110.

(2) Example of Packet Format

Figure 3:
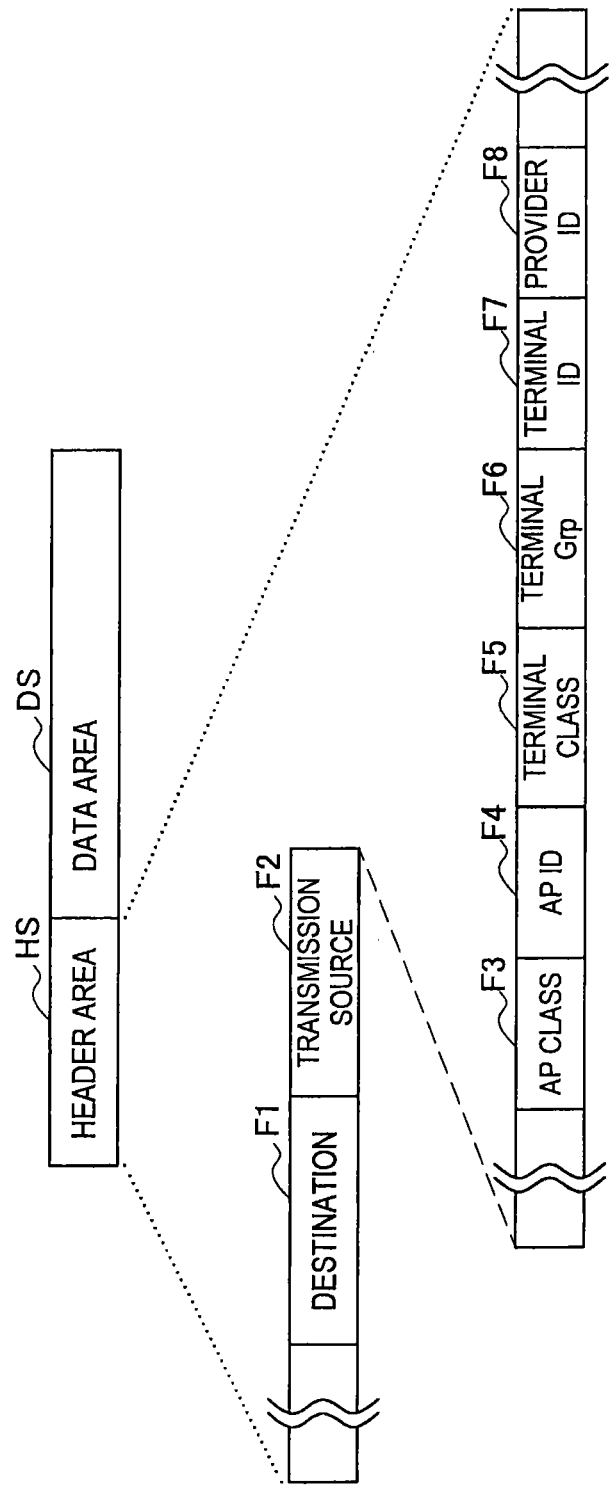
FIG. 3 is an explanatory diagram illustrating an example of a packet format.

FIG. 3 is an explanatory diagram illustrating an example of a packet format of a data packet transmitted by the terminal device 100 in this embodiment. Referring to FIG. 3, the data packet in accordance with this embodiment includes a header area HS and a data area DS. As illustrated in FIG. 3, the header area HS has eight fields F1 to F8 in which control information is stored. The data area DS is an area for storing the above-described AP data.

In the destination field F1 of the header area HS, information designating a destination node of the data packet is stored. The information stored in the destination field F1, for example, may be an Internet protocol (IP) address of the destination node, a media access control (MAC) address, a host name, or another unique identifier. When the terminal device 100 transmits AP data, the AP server 190 that provides a corresponding AP function becomes the destination node. In addition, when the terminal device 100 receives a data packet, the terminal device 100 becomes the destination node.

In the transmission source field F2, transmission source node information designating a transmission source node of the data packet is stored. When the terminal device 100 transmits AP data to the AP server 190, the terminal device 100 generating the AP data becomes the transmission source node.

The application (AP) class field F3 and the AP identifier (ID) field F4 are fields for storing an AP class and an AP ID, respectively. The AP class and the AP ID are control information regarding an AP relating to a data packet. The AP class is a class to which an individual AP belongs when APs have been classified into several classes. For example, a QoS class classified according to QoS requirements may be used as the AP class. The AP ID is an ID for uniquely identifying an individual AP. Values of the AP class and the AP ID supported by each terminal device 100 can be pre-stored by the storage unit 104.

The terminal class field F5, the terminal group (Grp) field F6, and the terminal ID field F7 are fields for storing a terminal class, a terminal group, and a terminal ID. The terminal class, the terminal group, and the terminal ID are control information regarding an MTC terminal. When MTC terminals have been classified into several classes and groups, the terminal class and the terminal group are a class and a group to which an individual terminal device belongs, respectively. For example, according to $3^{rd}$ Generation Partnership Project (3GPP) Technical Specification (TS) 22.368, the MTC terminal can be classified as security equipment, transportation-related equipment, payment equipment, health care equipment, remote control equipment, measurement equipment, consumer equipment, and the like according to its service field. In addition, for example, as in a vending machine or point of sales (POS) equipment for the payment equipment, a power meter or a gas meter for the measurement equipment, the MTC terminal can be classified in further detail according to its purpose. The terminal class, for example, may be a class of the MTC terminal corresponding to the service field or purpose. In addition, 3GPP TS 22.368, for example, proposes allocation of MTC terminals to one or more groups defined in terms of a QoS policy, a maximum bit rate, and the like. The terminal group, for example, may be a group defined to manage the MTC terminals based on the above-described group. Of course, the classification of the MTC terminal according to another concept may be used. The terminal ID is an ID for uniquely identifying an individual terminal device. Values of the terminal class, the terminal group, and the terminal ID of each terminal device 100 can be pre-stored by the storage unit 104.

The provider ID field F8 is a field for storing a provider ID that uniquely specifies a provider that provides an AP relating to a data packet transmitted by each terminal device 100. In addition, the provider ID can also be pre-stored by the storage unit 104.

(3) Flow of Data Transmission Process

Figure 4:
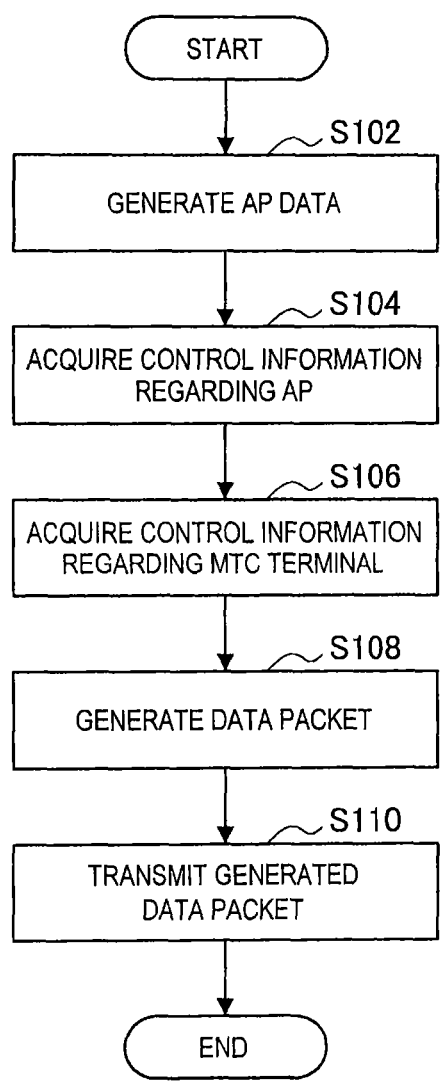
FIG. 4 is a flowchart illustrating an example of a flow of a data transmission process in accordance with the first embodiment.

FIG. 4 is a flowchart illustrating an example of the flow of the data transmission process by the terminal device 100 in accordance with this embodiment.

Referring to FIG. 4, first, the AP unit 102 of the terminal device 100 generates AP data periodically or according to occurrence of a predetermined event (step S102). Next, the communication control unit 110 acquires control information regarding an AP such as an AP class, an AP ID, or the like for the generated AP data from the storage unit 104 (step S104). In addition, the communication control unit 110 acquires control information such as a terminal class, a terminal group, a terminal ID, and the like regarding an MTC terminal of the terminal device 100 from the storage unit 104 (step S106). Next, the communication control unit 110 generates a data packet having a packet format illustrated in FIG. 3 using the acquired control information and the AP data (step S108). Here, a destination of the generated data packet, for example, can be designated by the AP unit 102 in association with the AP data. The wireless transmission unit 112 transmits the data packet generated by the communication control unit 110 to the base station 120 (step S110).

Although an example in which the terminal device 100 inserts the control information into the data packet has been described, another communication node (for example, the base station 120, the communication device 140, or the like) may insert the control information into the data packet instead of the terminal device 100. A device that inserts the control information into the data packet may be a device (for example, a relay station or the like capable of intervention between the terminal device 100 and the base station 120) not illustrated in FIG. 1. In the next section, an example in which the base station 120 inserts part of the control information into the data packet will be described.

[1-3. Base Station]

(1) Configuration Example of Device

Figure 5:
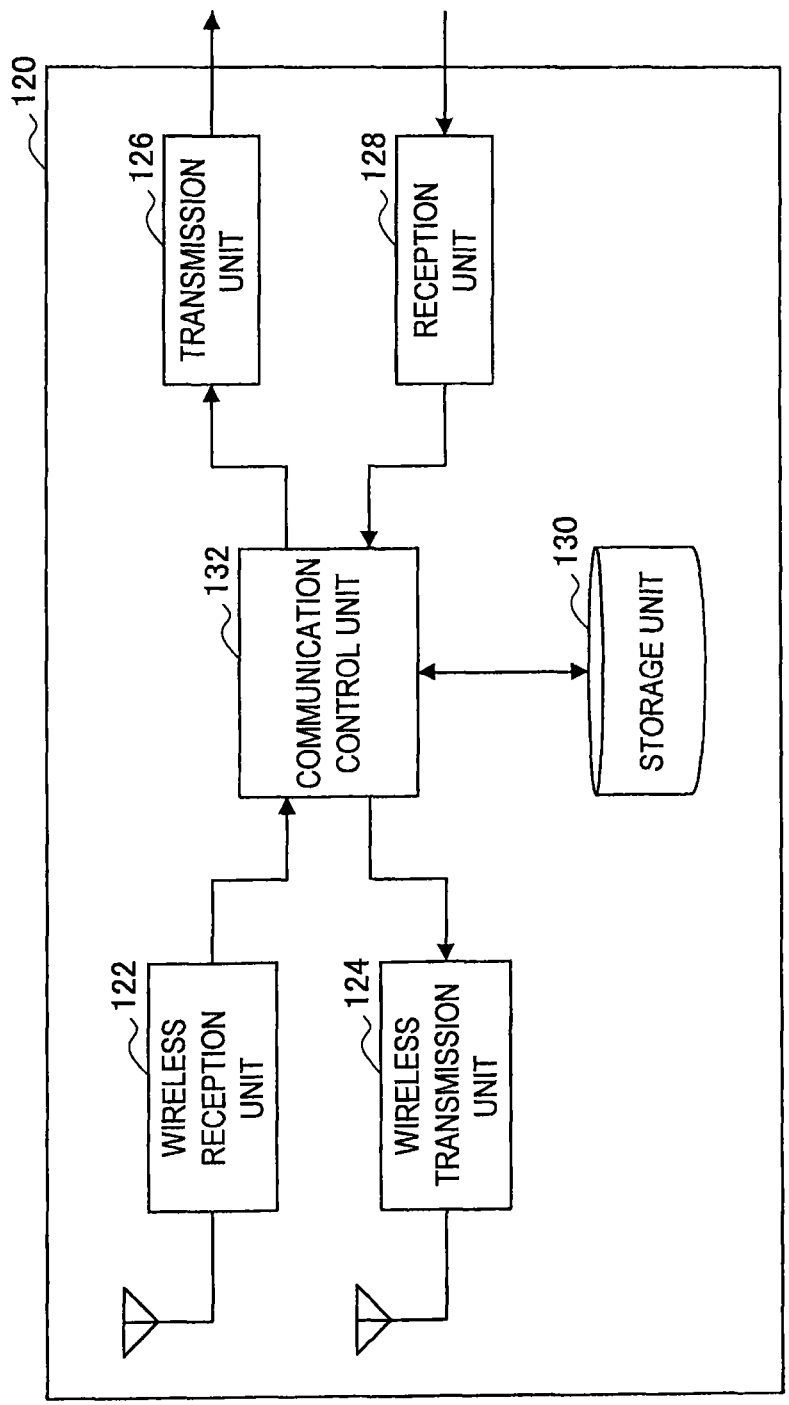
FIG. 5 is a block diagram illustrating an example of a configuration of a base station in accordance with the first embodiment.

FIG. 5 is a block diagram illustrating an example of a configuration of the base station 120 in accordance with this embodiment. Referring to FIG. 5, the base station 120 includes a wireless reception unit 122, a wireless transmission unit 124, a transmission unit 126, a reception unit 128, a storage unit 130, and a communication control unit 132.

The wireless reception unit 122 and the wireless transmission unit 124 have an antenna and an RF circuit for performing wireless communication among a plurality of terminal devices 100. The wireless reception unit 122 receives a data packet transmitted from the terminal device 100, and outputs the received data packet to the communication control unit 132. In addition, when a data packet addressed to the terminal device 100 is input from the communication control unit 132, the wireless transmission unit 124 transmits the data packet to the terminal device 100.

The transmission unit 126 and the reception unit 128 are communication interfaces for enabling the base station 120 to perform communication with the communication device 140 of the core network 10. When the data packet is input from the communication control unit 132, the transmission unit 126 transmits the data packet to the core network 10. When the data packet is received from the core network 10, the reception unit 128 outputs the data packet to the communication control unit 132.

The storage unit 130 stores a program and data for processing by the communication control unit 132 using a storage medium. In addition, the storage unit 130 may pre-store part of the control information illustrated in FIG. 3 in association with a terminal ID or address information of each terminal device 100.

The communication control unit 132, for example, causes the base station 120 to operate as a base station for cellular communication according to standard specs of LTE, LTE-A, or the like. In addition, in this embodiment, the communication control unit 132 can insert the above-described control information into the data packet transmitted from the terminal device 100 instead of the terminal device 100. For example, when the data packet from the terminal device 100 is input from the wireless reception unit 122, the communication control unit 132 acquires control information associated with a terminal ID or a transmission source address described within the data packet from the storage unit 130. The communication control unit 132 inserts the acquired control information into the data packet.

(2) Flow of Control Information Insertion Process

Figure 6:
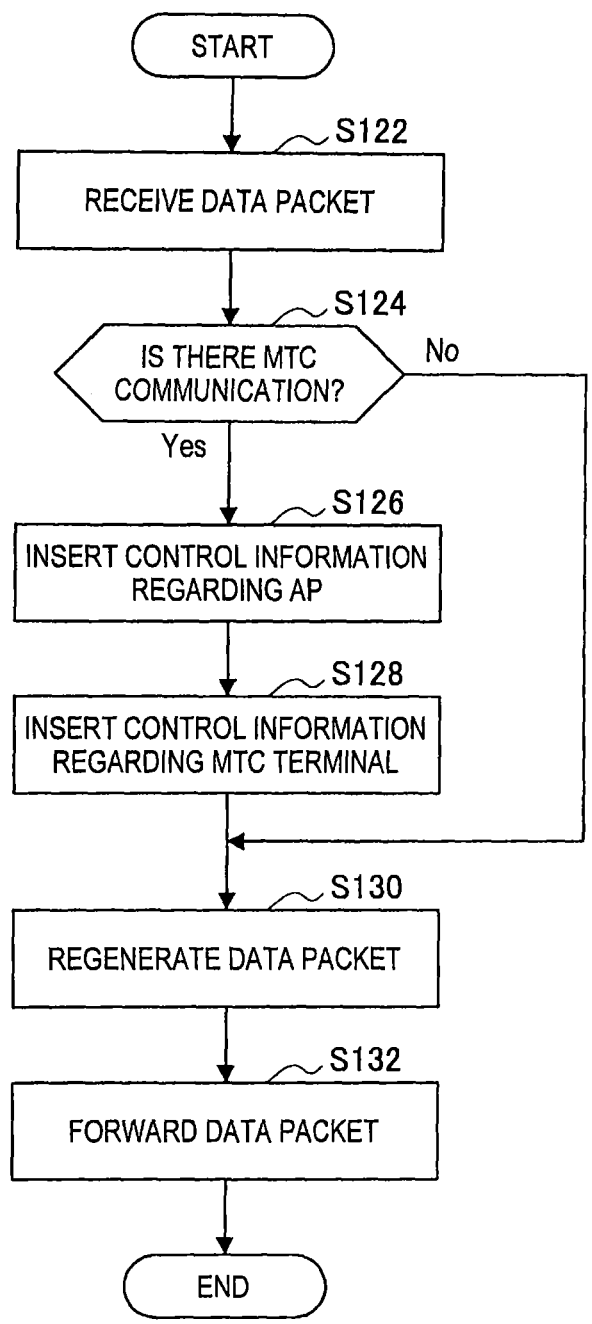
FIG. 6 is a flowchart illustrating an example of a flow of a control information insertion process in accordance with the first embodiment.

FIG. 6 is a flowchart illustrating an example of the flow of the control information insertion process by the base station 120 in accordance with this embodiment.

Referring to FIG. 6, first, the wireless reception unit 122 of the base station 120 receives a data packet transmitted from the terminal device 100 (step S122). The wireless reception unit 122 outputs the received data packet to the communication control unit 132. Next, the communication control unit 132 determines whether the received data packet is a packet for MTC communication (step S124). The packet for the MTC communication includes both a packet for which a transmission source is an MTC terminal and a packet for which an ultimate destination is an MTC terminal. The communication control unit 132, for example, can determine whether the data packet is a packet for MTC communication by referring to a terminal group or a terminal class included in the data packet or comparing a terminal ID included in the data packet with a pre-registered ID list. Alternatively, the communication control unit 132, for example, may determine whether the data packet is a packet for MTC communication by referring to an AP class included in the data packet or comparing an AP ID included in the data packet with a pre-registered ID list. Here, if the data packet is the packet for the MTC communication, then the process of steps S126 and S128 is performed.

When a device of the transmission source is the MTC terminal, the communication control unit 132 inserts control information (the AP class, the AP ID, and the like) regarding an AP into the data packet (step S126). In addition, the communication control unit 132 inserts control information (the terminal class, the terminal group, or the like) regarding the MTC terminal into the data packet (step S128).

Next, the communication control unit 132 regenerates the data packet (step S130). The regenerated data packet is forwarded from the transmission unit 126 to the core network 10 (step S132).

When the terminal device 100 inserts all control information to be used for a data forwarding process by the communication device 140 (the forwarding node) into the data packet as will be described next, the control information insertion process by the base station 120 illustrated in FIG. 6 is omitted. In this case, like the data packet transmitted from a normal user terminal, the data packet transmitted from the terminal device 100 is forwarded by the base station 120 to the core network 10.

[1-4. Forwarding Node]

(1) Configuration Example of Device

Figure 7:
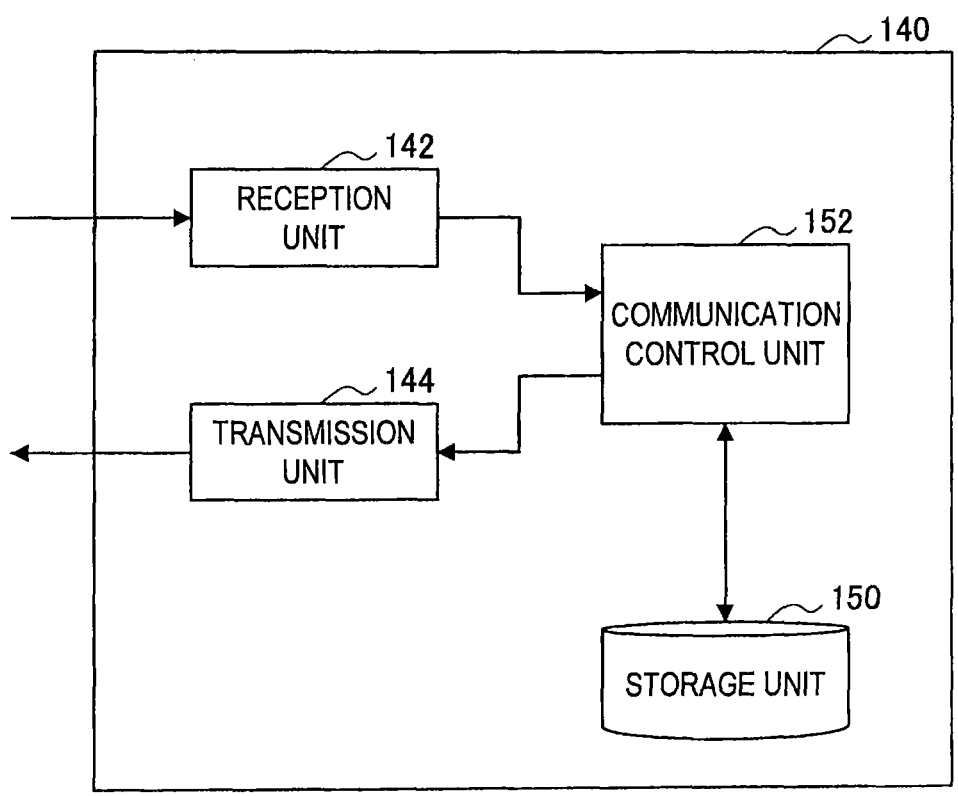
FIG. 7 is a block diagram illustrating an example of a configuration of a forwarding node in accordance with the first embodiment.

FIG. 7 is a block diagram illustrating an example of a configuration of the communication device 140 in accordance with this embodiment. Referring to FIG. 7, the communication device 140 includes a reception unit 142, a transmission unit 144, a storage unit 150, and a communication control unit 152.

The reception unit 142 and the transmission unit 144 are communication interfaces for enabling the communication device 140 to perform communication with other communication devices. When a data packet is received from another communication device, the reception unit 142 outputs the data packet to the communication control unit 152. When a data packet is input from the communication control unit 152, the transmission unit 144 transmits the data packet to another communication device.

The storage unit 150 stores a program and data for processing by the communication control unit 152 using a storage medium. In addition, the storage unit 150 stores forwarding destination data associated with classification based on control information within a data packet and a forwarding destination node of the data packet. An example of the forwarding destination data stored by the storage unit 150 will be described later.

When a device of a transmission source of the data packet received by the reception unit 142 is an MTC terminal, the communication control unit 152 selects a forwarding destination node of a data packet from a plurality of forwarding destination node candidates so that traffic is distributed. More specifically, in this embodiment, the communication control unit 152 selects the forwarding destination node of the data packet based on control information within the data packet. For example, the communication control unit 152 may classify the data packet according to the control information within the data packet, and select the forwarding destination node associated with the classification of the data packet in the forwarding destination data stored by the storage unit 150 as the forwarding destination node of the data packet. Alternatively, the communication control unit 152 may select the forwarding destination node of each data packet, for example, so that forwarding destinations of data packets belonging to the same classification may be distributed to a plurality of forwarding destination nodes. The selection of the forwarding destination node by the communication control unit 152 is typically performed regardless of a routing metric relating to a path to a destination node of the data packet. That is, the communication device 140 in accordance with this embodiment does not necessarily select a forwarding destination node in which a metric such as the number of hops to the destination node or costs of a communication path is minimized.

FIGS. 8A and 8B are explanatory diagrams each illustrating an example of forwarding destination data available for selection of a forwarding destination node by the communication device 140.

Referring to FIG. 8A, forwarding destination data 151a is shown as a first example. The forwarding destination data 151a has three data items of an "AP class," a "terminal ID," and a "forwarding destination node." In the first example, the communication control unit 152 classifies data packets into six categories according to AP classes and terminal IDs included in control information within the data packets. For example, when the AP class is "C1," the data packet is classified into one of first to fourth categories according to two lower-order bits of the terminal ID. The forwarding destination node of the data packet classified into the first category (the two lower-order bits of the terminal ID=[00]) is a node N1. The forwarding destination node of the data packet classified into the second category (the two lower-order bits of the terminal ID=[01]) is a node N2. The forwarding destination node of the data packet classified into the third category (the two lower-order bits of the terminal ID=[10]) is a node N3. The forwarding destination node of the data packet classified into the fourth category (the two lower-order bits of the terminal ID=[11]) is a node N4. In addition, when the AP class is "C2," the data packet is classified into a fifth category regardless of the terminal ID. The forwarding destination node of the data packet classified into the fifth category is a node N5. When the AP class is "C3," the data packet is classified into a sixth category regardless of the terminal ID. The forwarding destination node of the data packet classified into the sixth category is a node N6.

The AP class "C1," for example, is a class in which a low delay is recommended in relation to QoS (for example, an upper limit of an allowed delay is designated). In this case, it is possible to avoid the occurrence of congestion and reduce a risk of QoS violation by distributing the forwarding destination of the data packet to a plurality of forwarding destination nodes according to a terminal ID as in the first example. The communication control unit 152, for example, may distribute the forwarding destination of the data packet of the AP class "C1" among the four forwarding destination nodes N1 to N4 in a round-robin scheme or a random scheme without using the terminal ID.

In addition, in the first example, data packets of different AP classes are forwarded to different forwarding destination nodes. For example, the nodes N5 and N6 may be nodes having throughput not higher than that of the nodes N1 to N4 or nodes having low-speed links. The congestion of traffic is less likely to be caused by selecting a different forwarding destination node for every AP.

Referring to FIG. 8B, forwarding destination data 151b is illustrated as the second example. The forwarding destination data 151b has two data items such as a "terminal class" and a "forwarding destination node". In the second example, the communication control unit 152 classifies data packets into four categories according to terminal classes included in control information of the data packets. For example, when the terminal class is "T1", the data packet is classified into a first category, and the node N1 serving as the forwarding destination node is selected. When the terminal class is "T2", the data packet is classified into a second category, and the node N2 serving as the forwarding destination node is selected. When the terminal class is "T3", the data packet is classified into a third category, and the node N3 serving as the forwarding destination node is selected. When the terminal class is "T4", the data packet is classified into a fourth category, and the node N4 serving as the forwarding destination node is selected.

In the second example, because data packets of different terminal classes are forwarded to different forwarding destination nodes, forwarding destinations of data packets are distributed between terminal classes. Thus, the possibility of congestion of data packets is reduced. The communication control unit 152, for example, may distribute forwarding destinations of data packets from the terminal devices 100 of the same terminal class in the round-robin scheme or the random scheme among the four forwarding destination nodes N1 to N4. In addition, a terminal group may be used instead of the terminal class.

All the communication devices 140 within the core network 10 may not have a function serving as a forwarding destination node described here. In addition, content of forwarding destination node data may differ for every communication device 140 that functions as the forwarding destination node. That is, a first forwarding destination node may have forwarding destination data illustrated in FIG. 8A, while a second forwarding destination node may have forwarding destination data illustrated in FIG. 8B. The forwarding destination node data may be separately registered and updated in each forwarding destination node or may be collectively managed and dynamically updated in an information management server as described in the second embodiment.

(2) Flow of Data Forwarding Process

Figure 9:
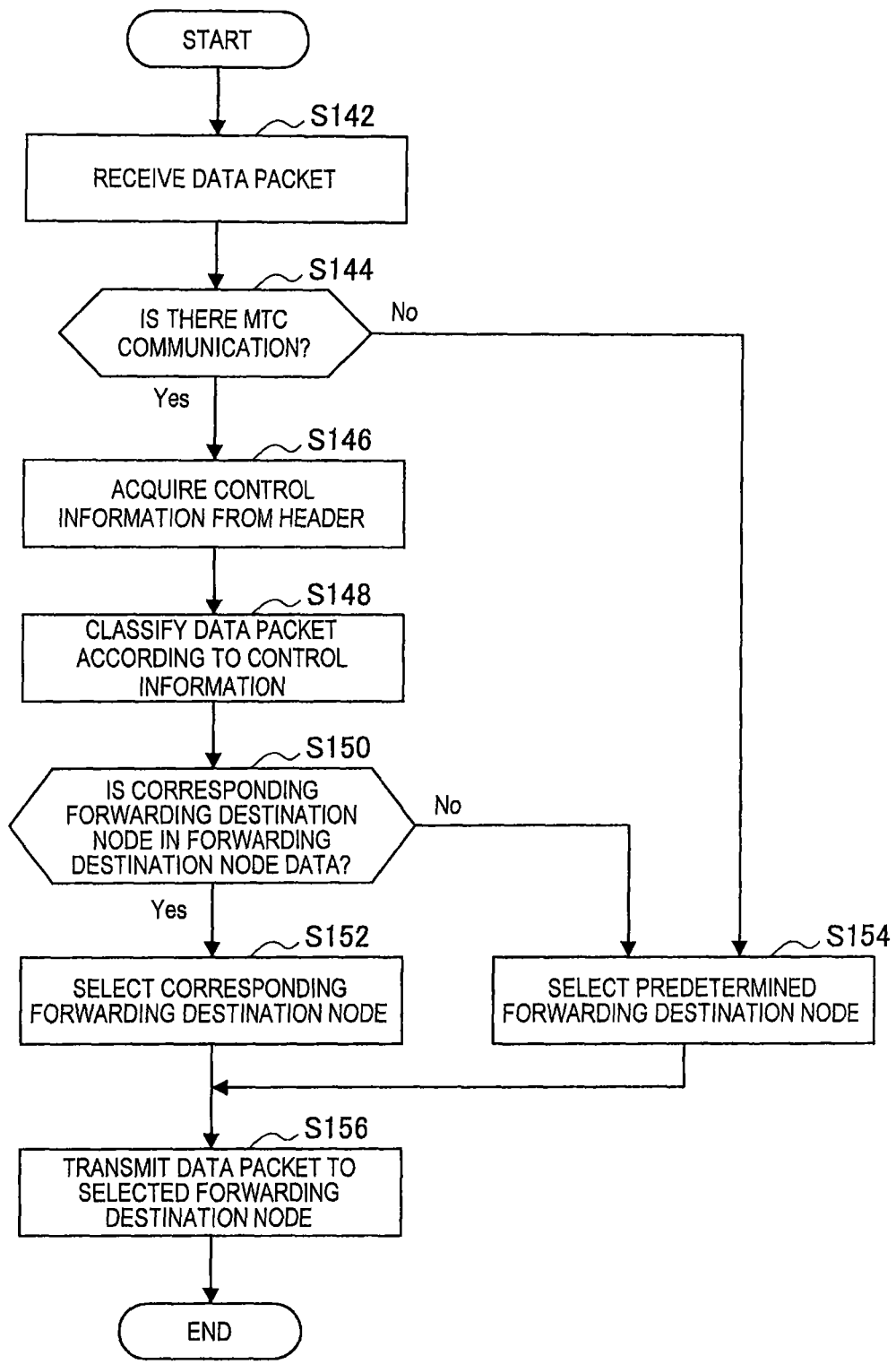
FIG. 9 is a flowchart illustrating an example of a data forwarding process in accordance with the first embodiment.

FIG. 9 is a flowchart illustrating an example of the data forwarding process by the communication device 140 in accordance with this embodiment.

Referring to FIG. 9, first, the reception unit 142 of the communication device 140 receives a data packet transmitted from the terminal device 100 (step S142). The reception unit 142 outputs the received data packet to the communication control unit 152. Next, the communication control unit 152 determines whether the received data packet is a packet for MTC communication (step S144). Here, if the data packet is the packet for the MTC communication, the process proceeds to step S146. On the other hand, if the data packet is not the packet for the MTC communication, the process proceeds to step S154.

In step S146, the communication control unit 152 acquires control information included in a header area of the data packet (step S146). Next, the communication control unit 152 classifies the data packet into one of a plurality of categories according to the acquired control information (step S148). Next, the communication control unit 152 determines whether there is a forwarding destination node corresponding to a category to which the data packet belongs in forwarding destination node data stored in the storage unit 150 (step S150). Here, when there is a corresponding forwarding destination node in the forwarding destination node data, the process proceeds to step S152. On the other hand, when there is no corresponding forwarding destination node in the forwarding destination node data, the process proceeds to step S154.

In step S152, the communication control unit 152 selects the forwarding destination node associated with the category to which the data packet belongs in the forwarding destination node data as the forwarding destination node of the data packet (step S152). On the other hand, in step S154, the communication control unit 152 selects a predetermined forwarding destination node as the forwarding destination node of the data packet (step S154). Here, the predetermined forwarding destination node, for example, may be a forwarding destination node fixedly defined in advance or may be a forwarding destination node dynamically selected according to a routing metric.

The transmission unit 144 forwards the data packet to the forwarding destination node selected by the communication control unit 152 (step S156).

[1-5. Summary of First Embodiment]

The first embodiment has been described above using FIGS. 1 to 9. In accordance with this embodiment, when a data packet has been transmitted from an MTC terminal, a forwarding destination node is selected from a plurality of forwarding destination node candidates according to a forwarding node within a communication network, and the data packet is forwarded to the selected forwarding destination node. Thereby, it is possible to route traffic of MTC communication to a plurality of routes and avoid or mitigate congestion. In addition, as a result, it is possible to increase the number of MTC terminals capable of being accommodated in a communication system.

In addition, in accordance with this embodiment, a forwarding node selects a forwarding destination node based on control information within a data packet. This control information can be used to classify the data packet in terms of an AP relating to MTC communication or a type of MTC terminal. According to this configuration, it is possible to systematically distribute the data packet according to a type of AP or a type of terminal. For example, it is also possible to distribute forwarding destinations of data packets from the same type of APs or the same type of terminals, which are likely to simultaneously transmit data, among a plurality of forwarding destination nodes. Accordingly, it is possible to avoid the occurrence of congestion by MTC communication in advance or effectively mitigate the congestion.

In addition, it is possible to introduce a mechanism for the above-described congestion avoidance without giving impact such as modification of a processing logic to an existing device such as an MTC terminal or a base station normally using information included in a data packet as control information.

In addition, in accordance with this embodiment, the selection of the forwarding destination node in the forwarding node can be performed regardless of a routing metric relating to a path to a destination node. This is a concept focusing on characteristics of MTC communication in which data may not necessarily be delivered to a destination at a maximum rate in many cases as compared with communication by a normal (human-used) user terminal. Accordingly, data packets of MTC communication are not concentrated on a so-called "optimum" communication path in terms of a routing metric. As a result, for example, a risk of MTC communication interfering with non-MTC communication such as voice communication or real-time streaming having high priority is reduced.

[1-6. Application Example]

In the first embodiment, an example in which a forwarding destination of a data packet transmitted from an MTC terminal is mainly distributed among a plurality of forwarding destination node candidates has been described. However, a mechanism of selection of the above-described forwarding destination node is also applicable to a data packet transmitted to the MTC terminal. For example, the communication device 140 illustrated in FIG. 1 has additional forwarding destination data describing a plurality of forwarding destination node candidates for a data packet transmitted to the terminal device 100, and traffic is distributed based on control information within the data packet and the additional forwarding destination data, so that the forwarding destination node of the data packet transmitted to the terminal device 100 may be selected from the plurality of forwarding destination node candidates.

<2. Description of Second Embodiment>

Next, the second embodiment will be described using FIGS. 10 to 24. In the first embodiment, a forwarding node distributes traffic of MTC communication and hence concentration of traffic on a specific communication path is prevented in advance. In the second embodiment to be described in this section, the traffic of MTC communication is guided to a path via an intermediate node to be described later, and hence the concentration of traffic on a specific communication path is ultimately prevented.

[2-1. Outline of System]

Figure 10:
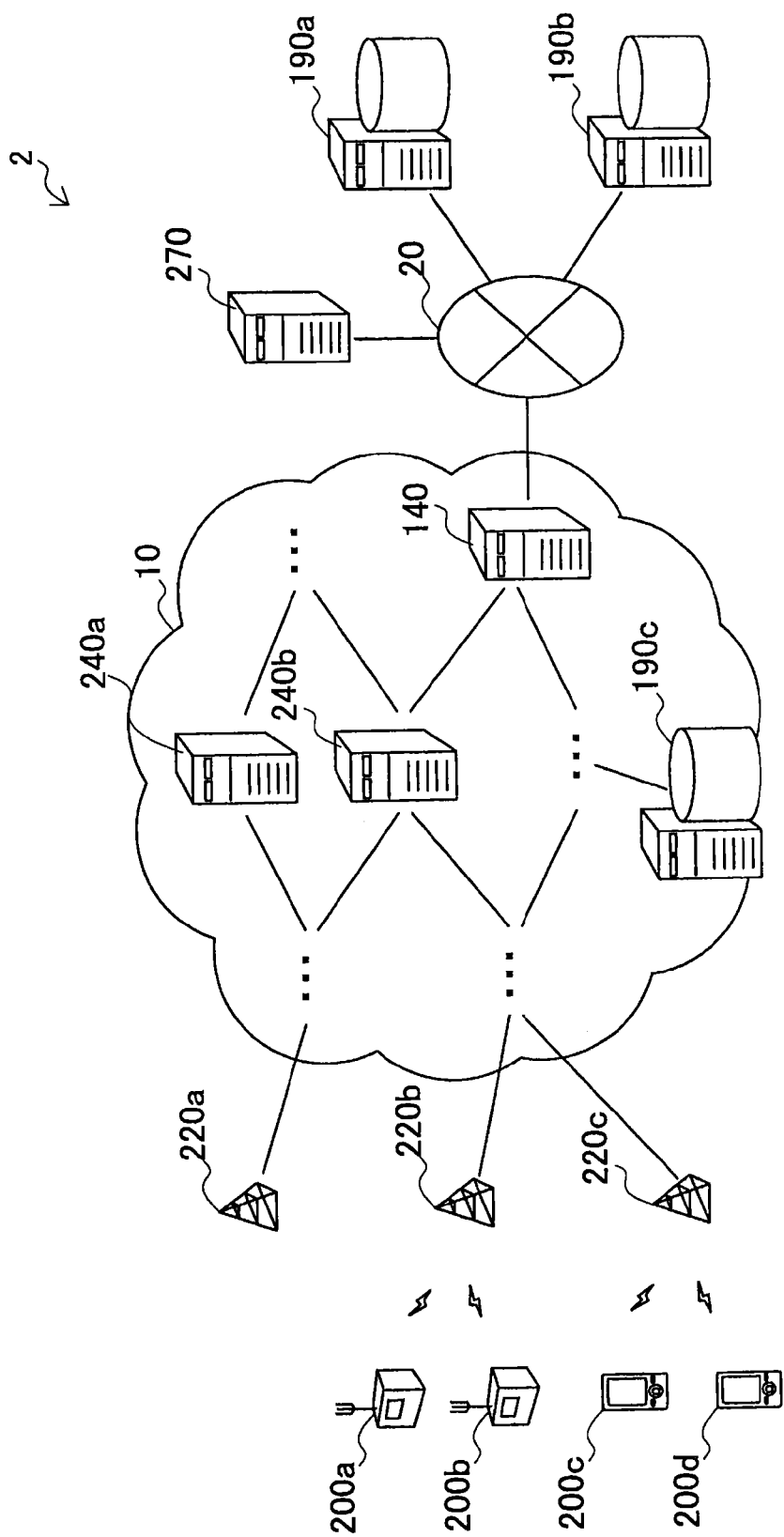
FIG. 10 is a schematic diagram illustrating an outline of a communication system in accordance with a second embodiment.

FIG. 10 is a schematic diagram illustrating an outline of a communication system 2 in accordance with the second embodiment. Referring to FIG. 10, the communication system 2 includes a plurality of terminal devices 200a to 200d, a plurality of base stations 220a to 220c, communication devices 140, 240a, and 240b within the core network 10, an information management server 270, and a plurality of AP servers 190a to 190c.

Like the terminal device 100 of the first embodiment, the terminal device 200 is a wireless communication device that operates as an MTC terminal. Each terminal device 200 transmits and receives a radio signal to and from the base station 220 that provides a wireless communication service to a cell to which the terminal device 200 belongs. The terminal device 200, for example, generates AP data, and transmits a data packet including the generated AP data to the base station 220. The data packet transmitted from the terminal device 200 to the base station 220 is ultimately delivered to a desired AP server 190 via several communication nodes. However, in this embodiment, the terminal device 200 can designate information designating a communication node different from a destination node, which is an ultimate destination, in a destination field of the data packet. In this specification, as described above, a communication node designated as a temporary destination (not the ultimate destination) of the data packet transmitted from the MTC terminal is referred to as an intermediate node.

Like the base station 220 in accordance with the first embodiment, the base station 220 is a communication node that provides a wireless communication service within a cell extending around its own device, for example, according to a cellular communication scheme represented by LTE, LTE-Advanced, or the like. The base station 220, for example, receives a data packet including AP data generated by the terminal device 200, and forwards the received data packet to a communication node of the core network 10. However, in this embodiment, the base station 220 can insert information designating an intermediate node into the destination field of the forwarded data packet. In addition, the base station 220 receives the data packet addressed to the terminal device 200 forwarded via the core network 10, and forwards the received data packet to a destination terminal device 200.

The communication device 240 is a communication node that is likely to be designated as the intermediate node. Each communication device 240, for example, may be an RNC, an MME, an HSS, an SGSN, a GGSN, or the like, or may be a switch or a router that establishes a connection between communication nodes. The communication device 240, for example, receives a data packet designated by its own device in the destination field, identifies an appropriate destination node using control information within the data packet, and forwards the data packet toward the identified destination node.

The information management server 270 is a communication device that manages a master of the destination node data to be used when the intermediate node identifies the destination node. In the example of FIG. 10, the information management server 270 is connected to the network 20. However, the present disclosure is not limited to this example, and the information management server 270, for example, may be located in the core network 10. In addition, the information management server 270 may be implemented on physically the same device as a communication node that forms the core network 10. The information management server 270 may manage a master of the forwarding destination data described in the first embodiment in addition to the master of the destination node data.

[2-2. Terminal Device]

(1) Configuration Example of Device

Figure 11:
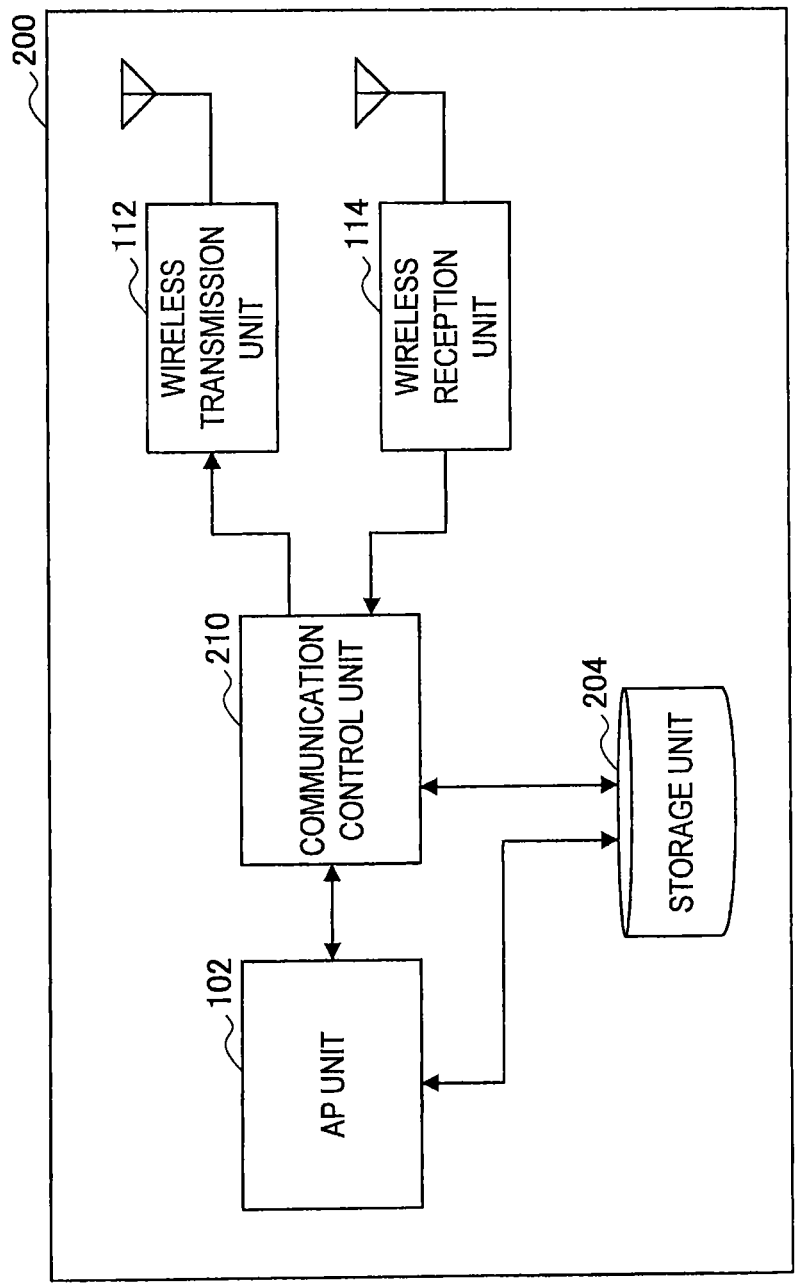
FIG. 11 is a block diagram illustrating an example of a configuration of a terminal device in accordance with the second embodiment.

FIG. 11 is a block diagram illustrating an example of a configuration of the terminal device 200 in accordance with this embodiment. Referring to FIG. 11, the terminal device 200 includes an AP unit 102, a storage unit 204, a communication control unit 210, a wireless transmission unit 112, and a wireless reception unit 114.

The storage unit 204 stores programs and data for processing by the AP unit 102 and the communication control unit 210 using a storage medium. In addition, like the storage unit 104 of the terminal device 100 in accordance with the first embodiment, the storage unit 204 stores data serving as a base for generation of AP data by the AP unit 102. In addition, the storage unit 204 pre-stores control information inserted into a data packet. Further, in this embodiment, the storage unit 204, for example, pre-stores intermediate node designation information designating an intermediate node different from a destination node on a path to an ultimate destination node of the data packet in association with an AP. The intermediate node designation information, for example, may be an IP address, a MAC address, a host name, or another unique ID of the intermediate node.

When the AP data to be transmitted to the AP server 190 is input from the AP unit 102, the communication control unit 210 generates a data packet including the AP data. At this time, the communication control unit 210 can insert the intermediate node designation information stored in association with an AP in the storage unit 204 into the destination field of the data packet. The communication control unit 210 causes the generated data packet to be transmitted from the wireless transmission unit 112. In addition, when the data packet is received by the wireless reception unit 114, the communication control unit 210 acquires the AP data included in the data packet and outputs the acquired AP data to the AP unit 102.

(2) Flow of Data Transmission Process

Figure 12:
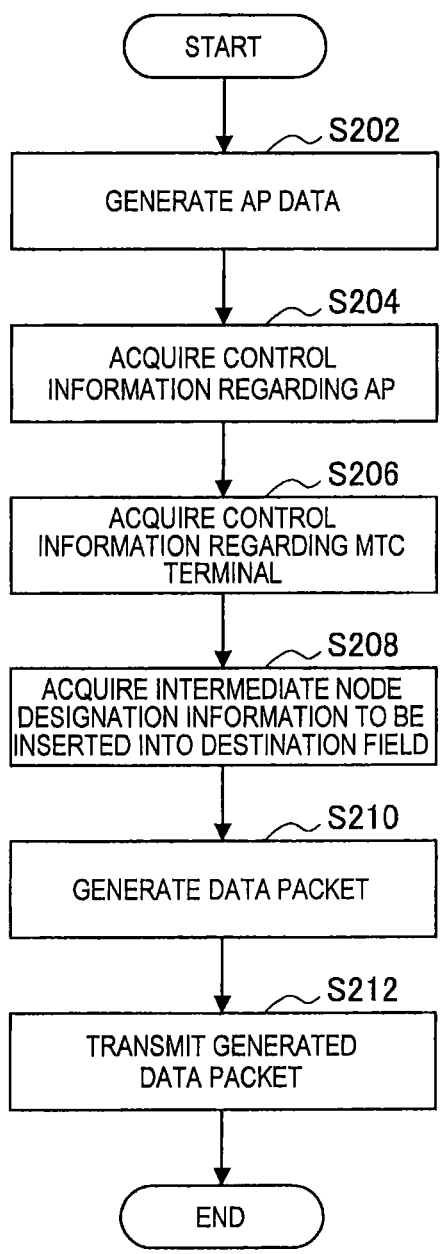
FIG. 12 is a flowchart illustrating an example of a flow of a data transmission process in accordance with the second embodiment.

FIG. 12 is a flowchart illustrating an example of the flow of the data transmission process by the terminal device 200 in accordance with this embodiment.

Referring to FIG. 12, first, the AP unit 102 of the terminal device 200 generates AP data periodically or according to a predetermined event (step S202). Next, the communication control unit 210 acquires control information regarding an AP such as an AP class, an AP ID, or the like for the generated AP data from the storage unit 204 (step S204). In addition, the communication control unit 210 acquires control information such as a terminal class, a terminal group, a terminal ID, and the like regarding an MTC terminal of the terminal device 200 from the storage unit 204 (step S206). Next, the communication control unit 210 acquires the intermediate node designation information to be inserted into the destination field of the data packet from the storage unit 204 (step S208). Next, the communication control unit 210 generates a data packet including the acquired intermediate node designation information and the control information in the header area and the data area (step S210). The wireless transmission unit 112 transmits the data packet generated by the communication control unit 210 to the base station 220 (step S212).

Although an example in which the terminal device 200 inserts the control information into the data packet has been described here, another communication node (for example, the base station 220, the communication device 240, or the like) may insert the control information into the data packet instead of the terminal device 200. In addition, as will be described next, instead of the terminal device 200, the other communication node may insert the intermediate node designation information into the destination field. A device that inserts the intermediate node designation information into the destination field may be a device (for example, a relay station capable of intervention between the terminal device 200 and the base station 220) not illustrated in FIG. 10. In the next section, an example in which the base station 220 inserts part of the control information into the data packet will be described. In the example of the next section, the terminal device 200 can insert the destination node designation information designating the ultimate destination node into the destination field as in a general data transmission process.

[2-3. Base Station]

(1) Configuration Example of Device

FIG. 13 is a block diagram illustrating an example of a configuration of the base station 220 in accordance with this embodiment. Referring to FIG. 13, the base station 220 includes a wireless reception unit 122, a wireless transmission unit 124, a transmission unit 126, a reception unit 128, a storage unit 230, and a communication control unit 232.

The storage unit 230 stores a program and data for processing by the communication control unit 232 using a storage medium. In addition, the storage unit 230 may pre-store at least part of the control information illustrated in FIG. 3 in association with a terminal ID or address information of each terminal device 200. In addition, in this embodiment, the storage unit 230 pre-stores intermediate node data obtained by listing candidates for the intermediate node to be designated for the data packet.

FIGS. 14A and 14B are explanatory diagrams each illustrating an example of intermediate node data. Referring to FIG. 14A, intermediate node data 231a is illustrated as the first example. The intermediate node data 231a has two data items such as an "AP class" and an "intermediate node." In this case, the intermediate node data 231a is data defining an intermediate node to be designated for every AP class of the data packet. On the other hand, referring to FIG. 14B, intermediate node data 231b is illustrated as the second example. The intermediate node data 231b has two data items such as a "terminal class" and an "intermediate node." In this case, the intermediate node data 231b is data defining an intermediate node to be designated for every terminal class of the data packet. The present disclosure is not limited to these examples. The intermediate node data may be data defining an intermediate node in association with arbitrary control information as illustrated in FIG. 3.

The communication control unit 232, for example, causes the base station 220 to operate as a base station for cellular communication according to standard specs of LTE, LTE-A, or the like. In addition, in this embodiment, the communication control unit 232 can insert intermediate node designation information designating an intermediate node different from the ultimate destination node of the data packet into the destination field of the data packet received by the wireless reception unit 122. For example, when the data packet from the terminal device 200 is input from the wireless reception unit 122, the communication control unit 232 can specify an intermediate node associated with an AP class or a terminal class described within the data packet using the above-described intermediate node data stored by the storage unit 230. The communication control unit 232 inserts the intermediate node designation information designating the specified intermediate node into the destination field of the data packet. Here, a plurality of patterns of a process of updating the destination field will be described later in detail in an example. The communication control unit 232 may designate a different intermediate node for every data packet, for example, in a round-robin scheme or a random scheme, from a plurality of intermediate node candidates.

In addition, the communication control unit 232 may insert control information to be used for enabling the intermediate node to identify the ultimate destination node of the data packet into the data packet transmitted from the terminal device 200 instead of the terminal device 200. The control information to be used for identifying the ultimate destination node, for example, can include at least one of pieces of the control information described using FIG. 3.

(2) Example of Destination Field Update Process

FIGS. 15A to 15E are explanatory diagrams each illustrating an example of the destination field update process by the communication control unit 232 in accordance with this embodiment. In each drawing, content of destination fields before and after the update by the communication control unit 232 is illustrated.

Figure 15A:
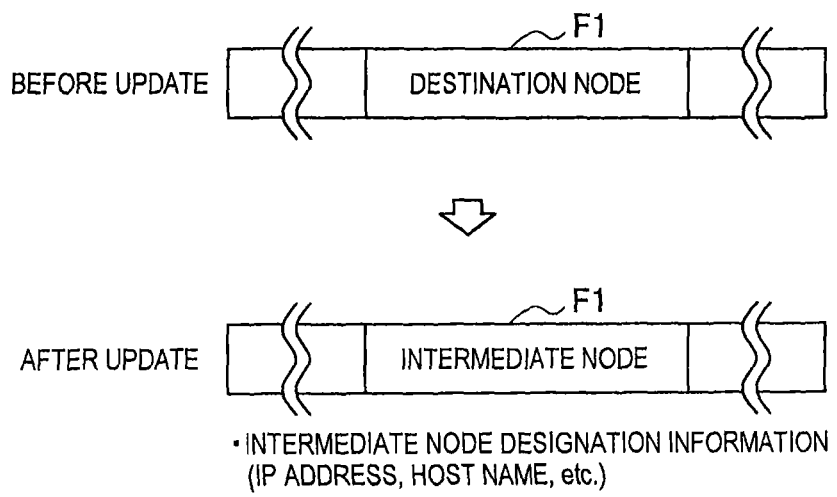
FIG. 15A is an explanatory diagram illustrating a first example of a destination field update process in accordance with the second embodiment.

In the first example illustrated in FIG. 15A, the communication control unit 232 simply overwrites information regarding the destination node inserted into the destination field F1 of the data packet over the intermediate node designation information (for example, an IP address, a host name, or the like of the intermediate node). In this case, the destination field update process can be most easily implemented.

Figure 15B:
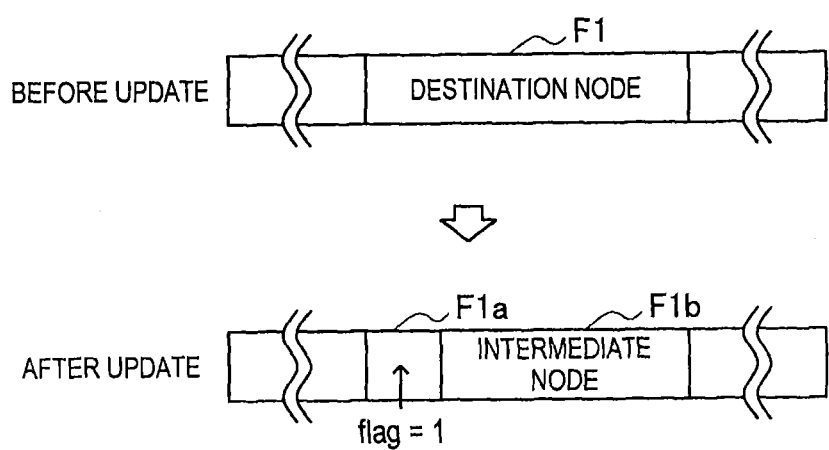
FIG. 15B is an explanatory diagram illustrating a second example of a destination field update process in accordance with the second embodiment.

In the second example illustrated in FIG. 15B, the communication control unit 232 overwrites information regarding the destination node inserted into the destination field F1 of the data packet over the intermediate node designation information (F1b), and adds a flag indicating that the destination field F1 has been changed to the data packet (F1a). In this case, the intermediate node receiving the data packet after the update can know whether the destination field F1 has been changed by referring to the flag. A position of the flag within the data packet may be a position different from the position illustrated in FIG. 15B.

Figure 15C:
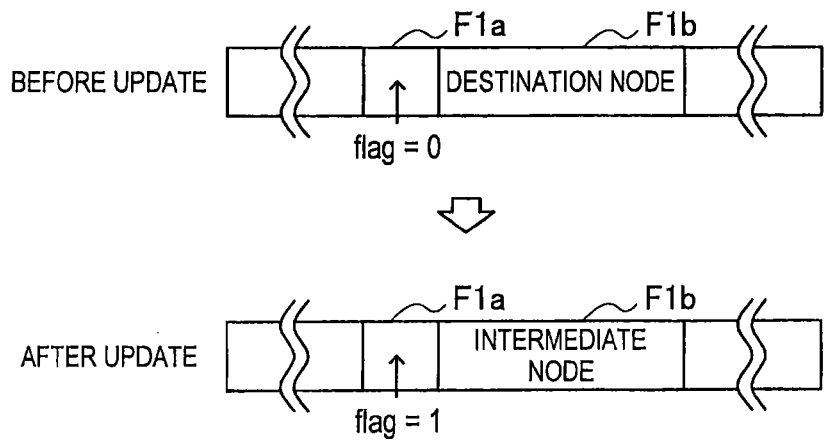
FIG. 15C is an explanatory diagram illustrating a third example of a destination field update process in accordance with the second embodiment.

In the third example illustrated in FIG. 15C, the destination field F1 is pre-divided into a flag sub-field F1a and a node-information sub-field F1b. In this case, for example, the terminal device 200 transmits a data packet in which the flag of the sub-field F1a has been set to zero and information regarding the destination node has been inserted into the sub-field F1b. The communication control unit 232 of the base station 220 can update the flag of the sub-field F1a to 1, and overwrite the sub-field F1b over the intermediate node designation information. In this case, all communication nodes receiving the data packet can know whether the destination field F1 has been changed by referring to the flag sub-field F1a.

Figure 15D:
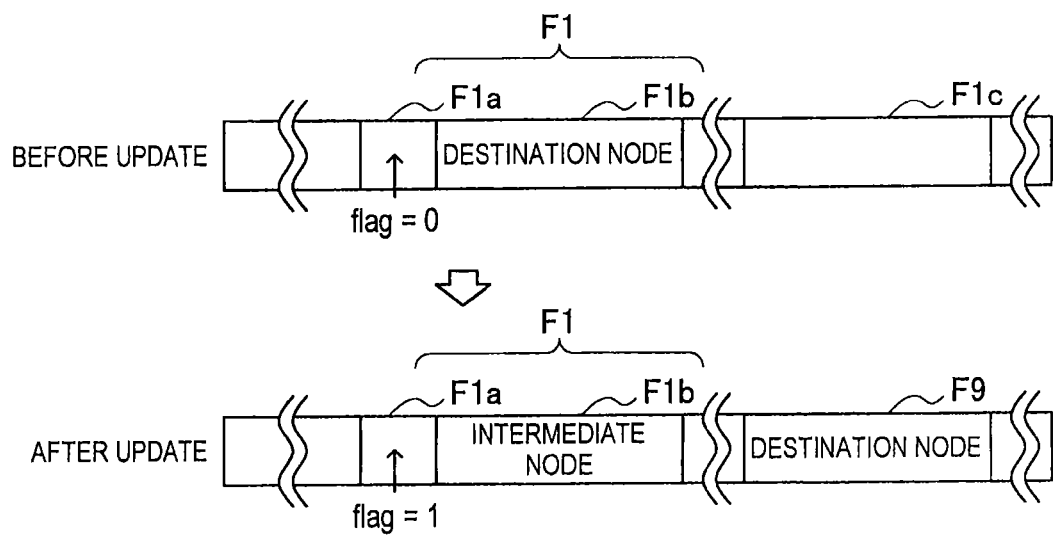
FIG. 15D is an explanatory diagram illustrating a fourth example of a destination field update process in accordance with the second embodiment.

In the fourth example illustrated in FIG. 15D, the communication control unit 232 updates the flag to 1, inserts the intermediate node designation information into the destination field F1, and transcribes information described in the destination field F1 upon receipt of the data packet to a reserved field F9. In this case, the intermediate node receiving the data packet after the update can identify the ultimate destination node by referring to information regarding the destination node described in the reserved field F9.

The fifth example illustrated in FIG. 15E is an example of the destination field update process capable of being adopted when a plurality of intermediate nodes are sequentially designated on the occasion of forwarding of one data packet. In this case, first, the communication control unit 232 of the base station 220 inserts the intermediate node designation information into the destination node field F1, and transcribes information designating the ultimate destination node (destination node 1) to the reserved field F9. Next, the intermediate node receiving the data packet inserts new intermediate node designation information into the destination field F1, and further transcribes original intermediate node designation information described in the destination field F1 to the reserved field F9. At this time, instead of flags of two values indicating the presence and absence of the update, it is desirable to add information indicating the number of updates to the data packet (increment the number of updates). Thereby, the intermediate node receiving the data packet after the update can easily know the number of pieces of node information transcribed to the reserved field F9. In the fifth example, because the reserved field F9 represents a history of designation of the intermediate node, it is possible to prevent a looped communication path from being formed by designating one intermediate node a plurality of times.

(3) Flow of Data Forwarding Process

Figure 16A:
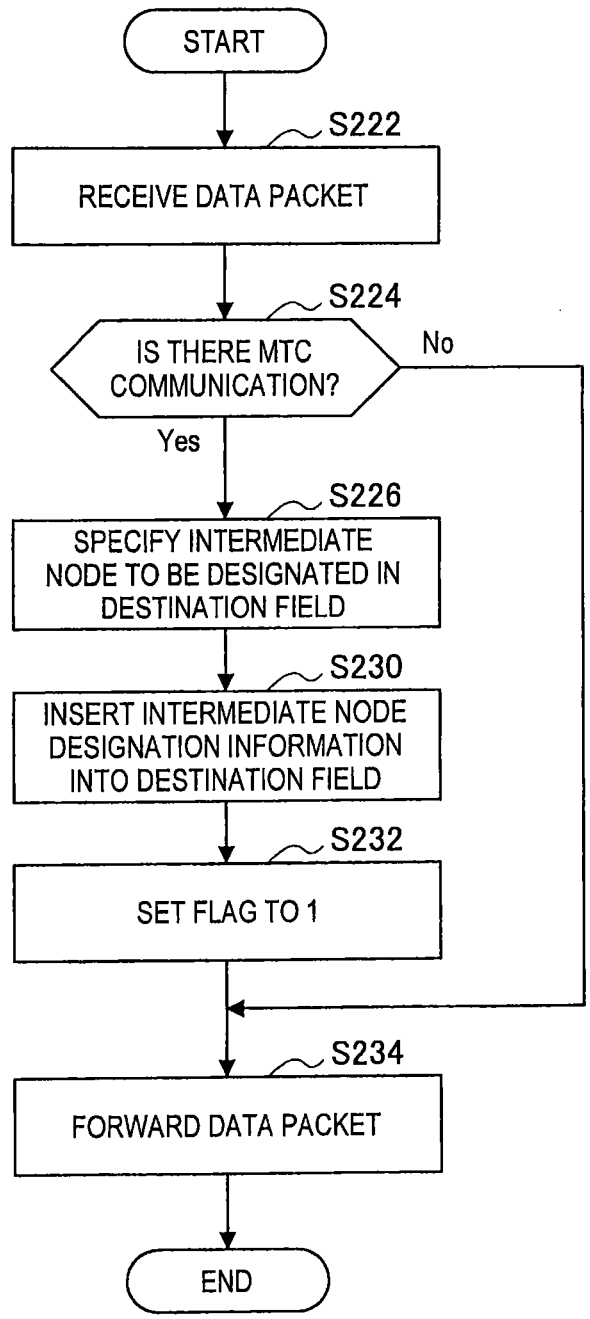
FIG. 16A is a flowchart illustrating an example of a flow of a data forwarding process by the base station in accordance with the second embodiment.
Figure 16B:
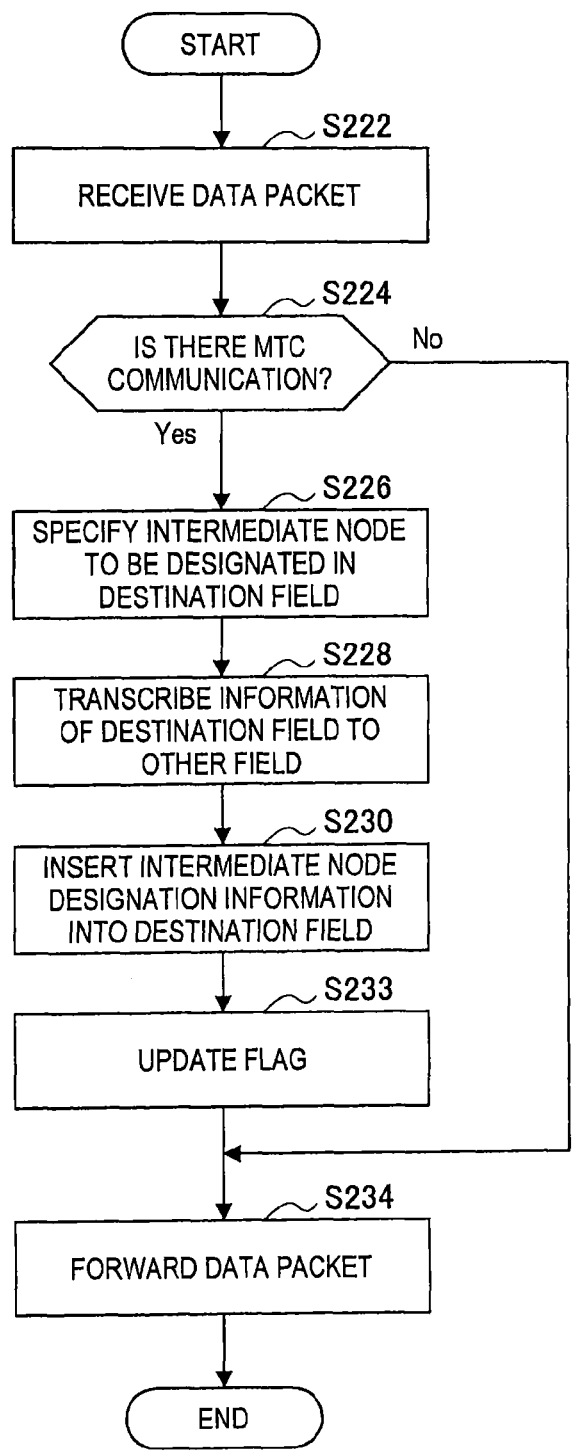
FIG. 16B is a flowchart illustrating another example of a flow of a data forwarding process by the base station in accordance with the second embodiment.

FIGS. 16A and 16B are flowcharts each illustrating an example of the flow of the data forwarding process by the base station 220 in accordance with this embodiment.

FIG. 16A illustrates an example of a flow including the destination field update process illustrated in FIGS. 15A to 15C. In the example of FIG. 16A, first, the wireless reception unit 122 of the base station 220 receives a data packet transmitted from the terminal device 200 (step S222). The wireless reception unit 122 outputs the received data packet to the communication control unit 232. Next, the communication control unit 232 determines whether the received data packet is a packet for MTC communication (step S224). Here, if the data packet is the packet for the MTC communication, then the process of steps S226 to S232 is performed.

When a device of a transmission source is an MTC terminal, the communication control unit 232 specifies an intermediate node to be designated in the destination field of the data packet using intermediate node data (step S226). Next, the communication control unit 232 inserts the intermediate node designation information designating the specified intermediate node into the destination field of the data packet (step S230). Next, the communication control unit 232 sets a flag (for example, Flag=1) indicating that the destination field has been changed in the data packet (step S232).

The data packet is forwarded from the transmission unit 126 to the core network 10 (step S234).

FIG. 16B illustrates an example of a flow including the destination field update process illustrated in FIGS. 15D and 15E. In the example of FIG. 16B, first, the wireless reception unit 122 of the base station 220 receives a data packet transmitted from the terminal device 200 (step S222). The wireless reception unit 122 outputs the received data packet to the communication control unit 232. Next, the communication control unit 232 determines whether the received data packet is a packet for MTC communication (step S224). Here, if the data packet is the packet for the MTC communication, then the process of steps S226 to S233 is performed.

When the device of the transmission source is the MTC terminal, the communication control unit 232 specifies an intermediate node to be designated in the destination field of the data packet using the intermediate node data (step S226). Next, the communication control unit 232 transcribes information regarding the destination node described in the destination field upon receipt of the data packet to another field such as the reserved field (step S228). Next, the communication control unit 232 inserts the intermediate node designation information designating the specified intermediate node into the destination field of the data packet (step S230). Next, the communication control unit 232 updates the flag (step S233).

The data packet is forwarded from the transmission unit 126 to the core network 10 (step S234).

[2-4. Intermediate Node]

(1) Configuration Example of Device

FIG. 17 is a block diagram illustrating an example of a configuration of the communication device 240 that operates as the intermediate node. Referring to FIG. 17, the communication device 240 includes a reception unit 142, a transmission unit 144, a storage unit 250, a communication control unit 252, and an information management unit 254.

The storage unit 250 stores programs and data for processing by the communication control unit 252 and the information management unit 254 using a storage medium. In addition, in this embodiment, the storage unit 250 may store destination node data in which control information within the data packet is associated with the destination node of the data packet as will be described later. In addition, like the storage unit 150 of the communication device 140 in accordance with the first embodiment, the storage unit 250 may store forwarding destination data in which the control information within the data packet is associated with the forwarding destination node of the data packet.

The communication control unit 252 identifies an ultimate destination node of the data packet from information included in a field different from the destination field when the reception unit 142 receives the data packet in which its own device is designated in the destination field. More specifically, the communication control unit 252, for example, can identify the ultimate destination node for every data packet using destination node data in which the control information within the data packet is associated with the destination node of the data packet.

FIG. 18 is an explanatory diagram illustrating an example of destination node data capable of being stored by the storage unit 250. Referring to FIG. 18, as an example, destination node data 251 has four data items such as an "AP class," a "terminal class," a "provider," and a "destination node." Among these, a combination of the "AP class," the "terminal class," and the "provider" becomes an identification key for identifying one destination node. For example, a data packet in which the AP class is "C1," the terminal class is "T3," and the provider is "J01" corresponds to a destination node D1. The data packet in which the AP class is "C1," the terminal class is "T3," and the provider is "J02" corresponds to a destination node D2 (description of the remaining records is omitted). Control information available as the identification key for identifying the destination node is not limited to this example. For example, an arbitrary item among the control information illustrated in FIG. 3 (or other control information) may be used as the identification key for identifying the destination node. In this embodiment, the above-described destination node data can be managed in the information management server 270 illustrated in FIG. 10 and shared between intermediate nodes.

The communication control unit 252 can identify the destination node corresponding to the control information within the data packet as the ultimate destination node using the above-described destination node data. When a device (for example, the above-described base station 220) designating the intermediate node transcribes information regarding the destination node to the reserved field, the communication control unit 252 can identify the ultimate destination node without using the destination node data. In this case, the storage unit 250 may not store the destination node data illustrated in FIG. 18.

The communication control unit 252 inserts destination node designation information designating the destination node identified as described above into the destination field of the data packet. That is, the communication control unit 252 corrects information of the temporarily designated destination field to information of the destination node at which the data packet should ultimately arrive. The communication control unit 252 causes the transmission unit 144 to transmit a data packet in which the ultimate destination node designation information is included in the destination field.

The communication control unit 252 may select a forwarding destination node (the next hop) of the data packet from a plurality of forwarding destination node candidates so that traffic is distributed as in the forwarding node in accordance with the first embodiment. In addition, by inserting intermediate node designation information designating a separate intermediate node instead of the ultimate destination node into the destination field, the communication control unit 252 may further forward the data packet to the separate intermediate node.

The information management unit 254 acquires update data for updating the destination node data stored by the storage unit 250 from the information management server 270, and updates the destination node data using the acquired update data. The information management unit 254 may request the information management server 270 to periodically distribute the update data at a constant frequency. Alternatively, when the update data has been received from the information management server 270, the information management unit 254 may passively update the destination node data.

(2) Flow of Data Forwarding Process

Figure 19A:
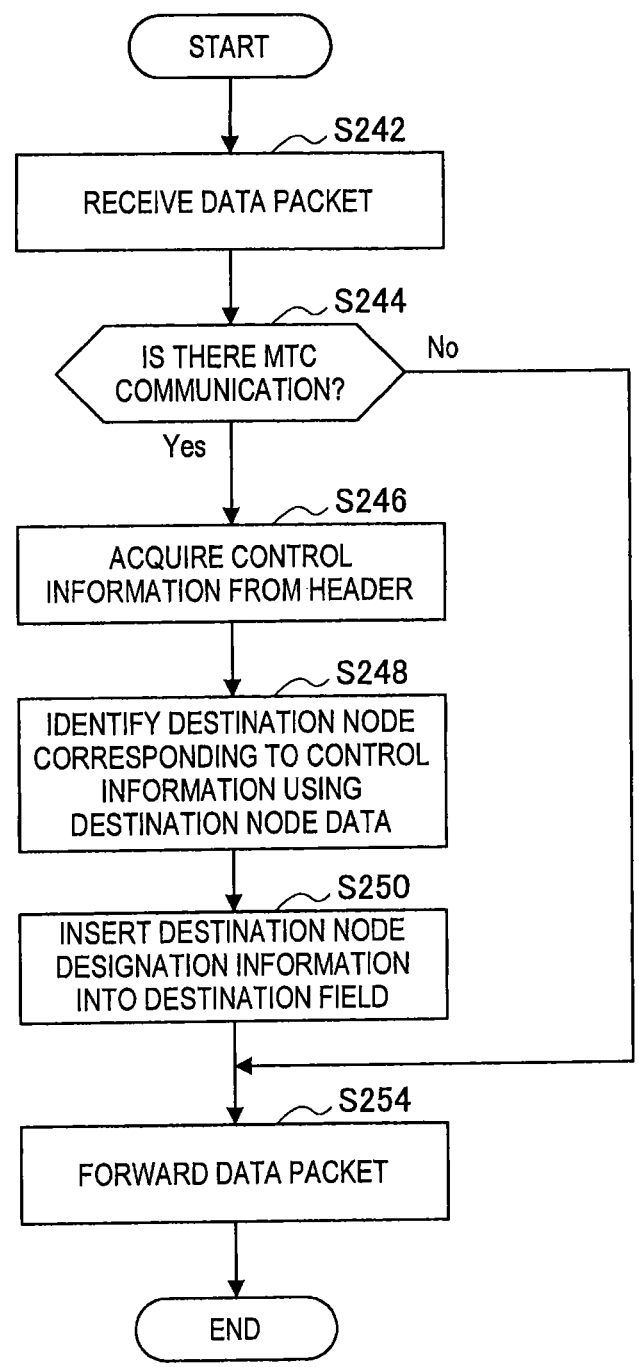
FIG. 19A is a flowchart illustrating an example of a flow of a data forwarding process by the intermediate node in accordance with the second embodiment.
Figure 19B:
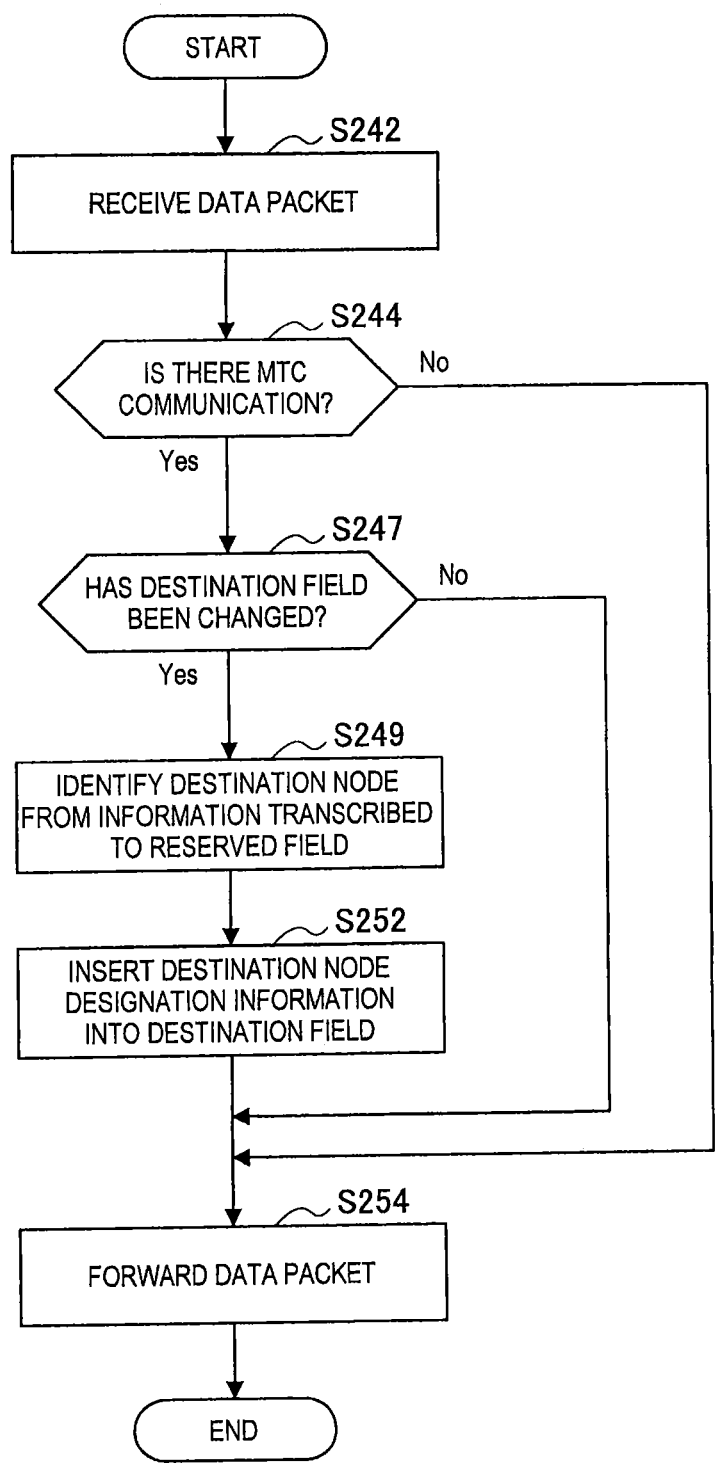
FIG. 19B is a flowchart illustrating another example of a flow of a data forwarding process by the intermediate node in accordance with the second embodiment.

FIGS. 19A and 19B are flowcharts each illustrating an example of a flow of a data forwarding process by the communication device 240 in accordance with this embodiment.

FIG. 19A illustrates an example of a flow including a destination node identification process using destination node data. In the example of FIG. 19A, first, the reception unit 142 of the communication device 240 receives a data packet transmitted from the terminal device 200 (step S242). The reception unit 142 outputs the received data packet to the communication control unit 252. Next, the communication control unit 252 determines whether the received data packet is a packet for MTC communication (step S244). Here, if the data packet is the packet for the MTC communication, the process proceeds to step S246. On the other hand, if the data packet is not the packet for the MTC communication, the process proceeds to step S254.

In step S246, the communication control unit 252 acquires control information included in the header area of the data packet (step S246). Next, the communication control unit 252, for example, identifies a forwarding destination node corresponding to a combination of an AP class, a terminal class, and a provider included in the acquired control information using destination node data (step S248). The communication control unit 252 inserts destination node designation information designating the identified destination node into the destination field of the data packet (step S250). At this time, the communication control unit 252 updates a value of the flag within the data packet if necessary.

The transmission unit 144 forwards the data packet to the next hop (for example, a forwarding destination node or a predetermined communication node selected so that traffic is distributed) (step S254).

FIG. 19B illustrates an example of a flow of a data forwarding process not using destination node data. In the example of FIG. 19B, first, the reception unit 142 of the communication device 240 receives a data packet transmitted from the terminal device 200 (step S242). The reception unit 142 outputs the received data packet to the communication control unit 252. Next, the communication control unit 252 determines whether the received data packet is a packet for MTC communication (step S244). Here, if the data packet is the packet for the MTC communication, the process proceeds to step S247. On the other hand, if the data packet is not the packet for MTC communication, the process proceeds to step S254.

In step S247, the communication control unit 252 determines whether the destination field has been changed by referring to a flag within the data packet (step S247). Here, when the destination field has been changed, the process proceeds to step S249. On the other hand, when the destination field has not been changed, the process proceeds to step S254.

In step S249, the communication control unit 252 identifies a destination node from information transcribed to the reserved field within the data packet (step S249). The communication control unit 252 inserts destination node designation information designating the identified destination node into the destination field of the data packet (step S252). At this time, the communication control unit 252 updates a value of the flag within the data packet if necessary.

The transmission unit 144 forwards the data packet to the next hop (for example, a forwarding destination node or a predetermined communication node selected so that traffic is distributed) (step S254).

[2-5. Example of Communication Path]

Figure 20:
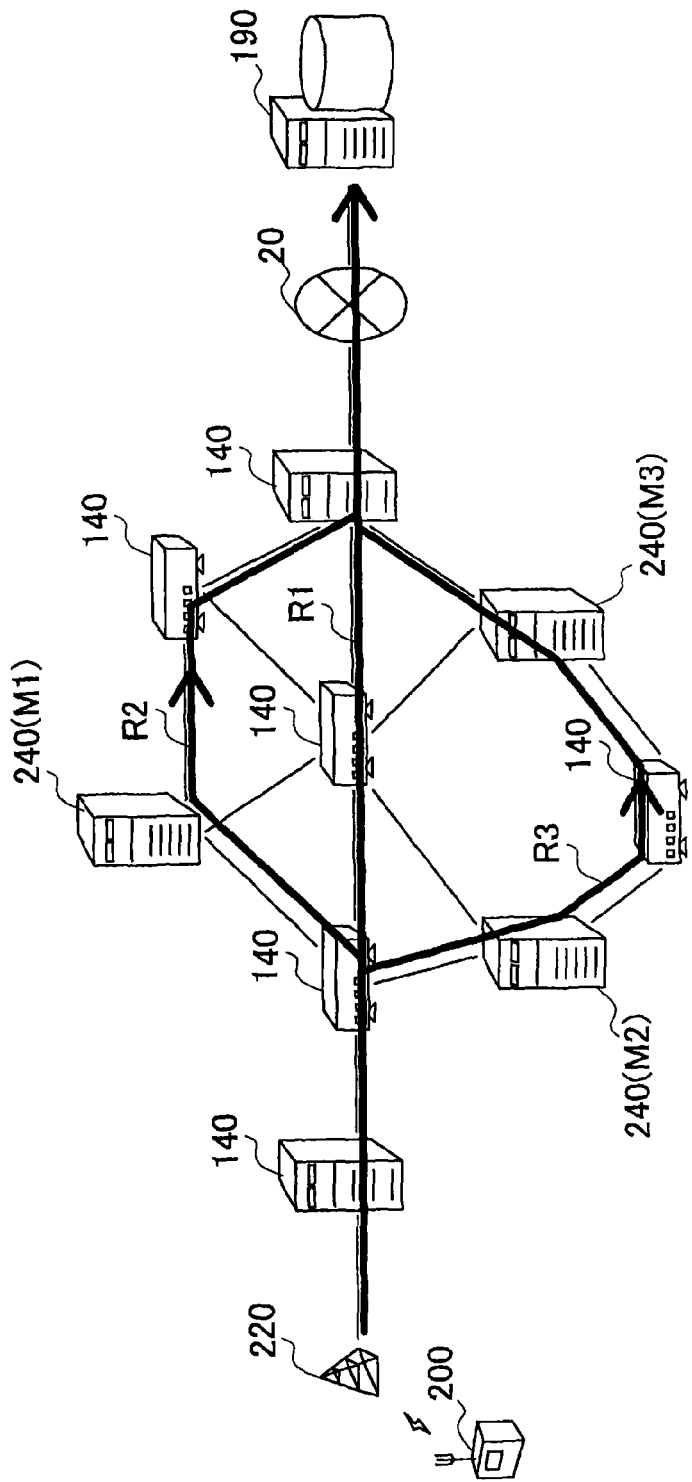
FIG. 20 is an explanatory diagram illustrating an example of a communication path capable of being implemented in accordance with the second embodiment.

FIG. 20 is an explanatory diagram illustrating the example of the communication path capable of being implemented in accordance with this embodiment. Referring to FIG. 20, as an example, three communication paths R1, R2, and R3 simplified between the terminal device 200, which is a transmission source of MTC communication, and the AP server 190, which is a destination, are illustrated. Control signaling, which is collaterally performed, such as an acknowledgement (ACK) and a negative acknowledgement (NACK) is not illustrated in the drawing. The communication path R1 is a shortest path (having an optimum routing metric) between the terminal device 200 and the AP server 190. On the other hand, the communication paths R2 and R3 are redundant paths that bypass some links included in the communication path R1.

For example, when the terminal device 200 or the base station 220 has designated an intermediate node M1 in the destination field of the data packet, the data packet can reach the AP server 190 via the communication path R2. In addition, for example, when the terminal device 200 or the base station 220 has designated an intermediate node M2 and the intermediate node M2 has further designated an intermediate node M3, the data packet can reach the AP server 190 via the communication path R3. By causing the data packet of the MTC communication to bypass the shortest path as described above, the traffic is distributed and the concentration of traffic on a specific communication path is prevented in advance.

[2-6. Information Management Server]

(1) Configuration Example of Device

Figure 21:
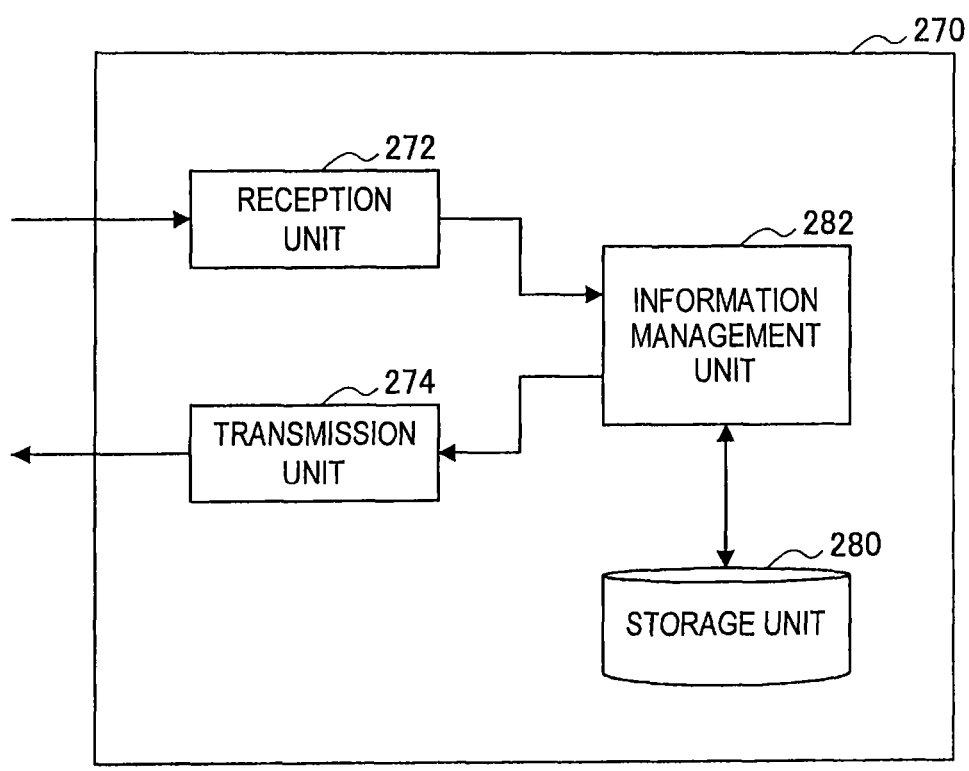
FIG. 21 is a block diagram illustrating an example of a configuration of an information management server in accordance with the second embodiment.

FIG. 21 is a block diagram illustrating an example of a configuration of the information management server 270 in accordance with this embodiment. Referring to FIG. 21, the information management server 270 includes a reception unit 272, a transmission unit 274, a storage unit 280, and an information management unit 282.

The reception unit 272 and the transmission unit 274 are communication interfaces for enabling the information management server 270 to communicate with other communication devices.

The storage unit 280 stores a master of the destination node data having substantially the same data items as the destination node data illustrated in FIG. 18 using a storage medium. In addition, the storage unit 280 may store a master of intermediate node data having substantially the same data items as the intermediate node data illustrated in FIGS. 14A and 14B. Further, the storage unit 280 may store a master of forwarding destination data described in the first embodiment.

The information management unit 282 provides a master management function for information stored by the storage unit 280. For example, the information management unit 282 provides an interface for accepting registration of new information regarding an AP when the AP server 190 has been newly introduced into the communication system 2. The interface, for example, may be a graphic user interface (GUI) that accepts an information input from a user on a screen of a device. Alternatively, the interface, for example, may be an application program interface (API) that receives registration information from the AP server 190. In addition, the interface provided by the information management unit 282 may accept a change and deletion of registered information. When an update of a master (addition, change, or deletion of information) occurs, the information management unit 282 distributes update data based on a difference in the master to communication nodes included in the communication system 2.

(2) Example of Update Data

FIG. 22 is an explanatory diagram illustrating the example of the update data. For example, it is assumed that a provider J01 has introduced new AP servers D1, D3, and D5. In this case a user (engineer) of the provider J01 registers information regarding each of the AP servers D1, D3, and D5 in the information management server 270 via a user interface provided by the information management unit 282. Here, the registered information, for example, can include an AP class, a terminal class, a communication schedule for MTC communication, and the like corresponding to each AP server. As a result, the information management unit 282 updates a master of destination node data stored by the storage unit 280, and generates update data 283 as illustrated in FIG. 22.

Referring to FIG. 22, the update data 283 is data describing information regarding a corresponding AP class, terminal class, and communication schedule for every application server, which can serve as a candidate for the destination node, using a provider ID as a key. An "update division" having a value of "addition," "change," "deletion," or the like is assigned to each record of the update data 283. An intermediate node receiving the above-described update data 283 from the information management server 270 causes separately stored destination node data to be synchronized with a latest master using the update data 283.

(3) Flow of Update Data Distribution Process

Figure 23A:
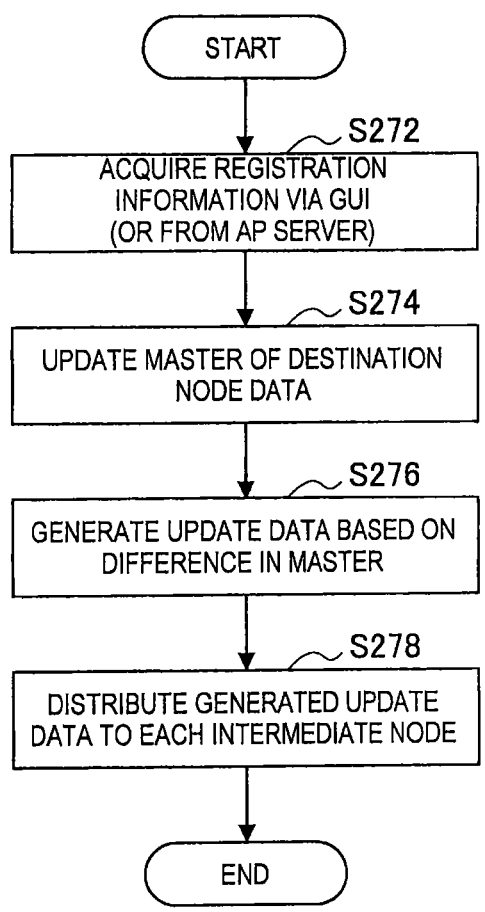
FIG. 23A is a flowchart illustrating a first example of a flow of an update data distribution process in accordance with the second embodiment.
Figure 23B:
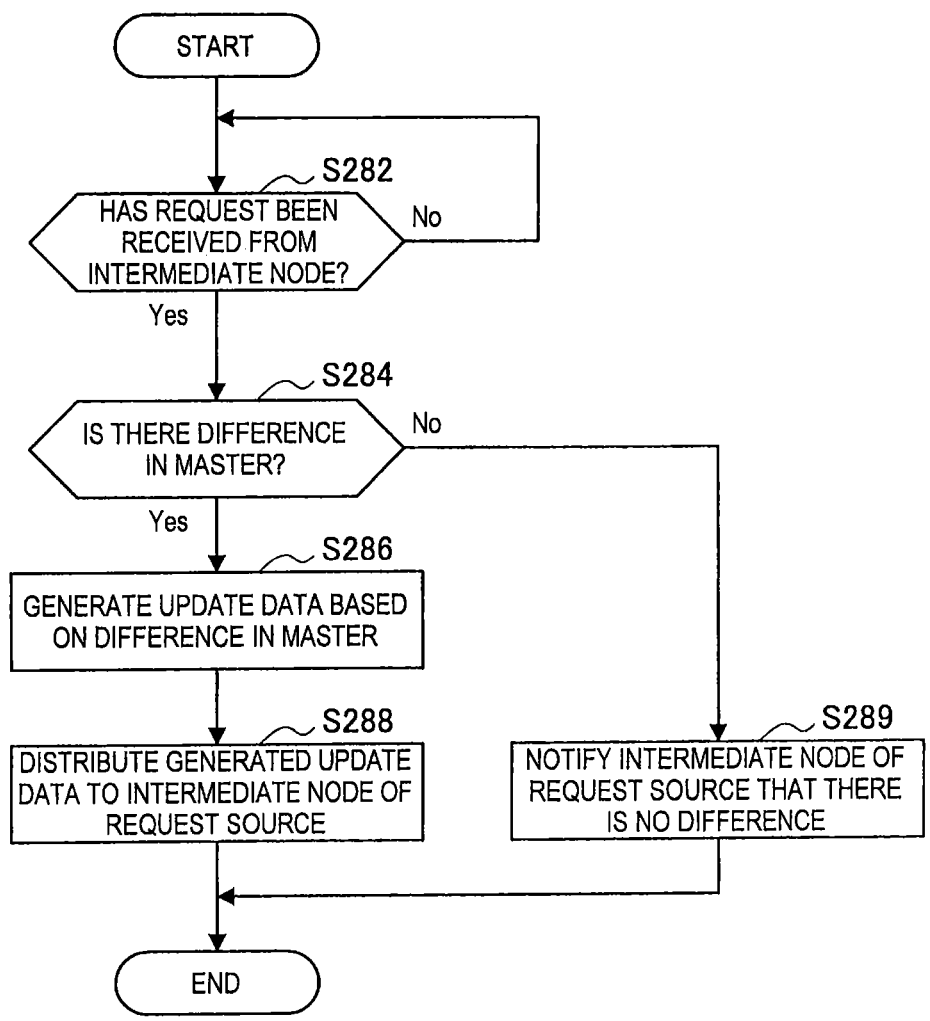
FIG. 23B is a flowchart illustrating a second example of a flow of an update data distribution process in accordance with the second embodiment.

FIGS. 23A and 23B are flowcharts each illustrating an example of the flow of the update data distribution process by the information management server 270 in accordance with this embodiment.

FIG. 23A illustrates an example in which update data is distributed to an intermediate node every time a master is updated. In the example of FIG. 23A, first, the information management unit 282 of the information management server 270 acquires registration information for the AP server 190 via a GUI (or from the AP server 190) (step S272). Next, the information management unit 282 updates a master of destination node data stored by the storage unit 280 using the acquired registration information (step S274). Next, the information management unit 282 generates update data as illustrated in FIG. 22 based on a difference in the master generated by the update (step S276). The transmission unit 274 distributes the update data generated by the information management unit 282 to each intermediate node (step S278). The update data may be broadcast to each intermediate node, and may be separately unicast or multicast.

FIG. 23B illustrates an example in which update data is distributed to an intermediate node according to a request from the intermediate node. In the example of FIG. 23B, when an update data distribution request is received by the reception unit 272 of the information management server 270 from the intermediate node, the process proceeds to step S284 (step S282). In step S284, the information management unit 282 determines whether a difference has occurred in a master of destination node data after previous distribution of update data (step S284). Here, when the difference has occurred in the master of the destination node data, the information management unit 282 generates update data based on the difference in the master (step S286). The transmission unit 274 distributes the update data generated by the information management unit 282 to an intermediate node of a request source (step S278). On the other hand, when the difference has not occurred in the master of the destination node data, the information management unit 282 notifies the intermediate node of the request source that there is no difference (step S289).

The present disclosure is not limited to the examples of FIGS. 23A and 23B, and the information management server 270, for example, may determine the presence/absence of the difference in the master periodically at a constant frequency, and actively distribute update data to each intermediate node when the difference has occurred.

(4) Flow of Data Update Process

Figure 24:
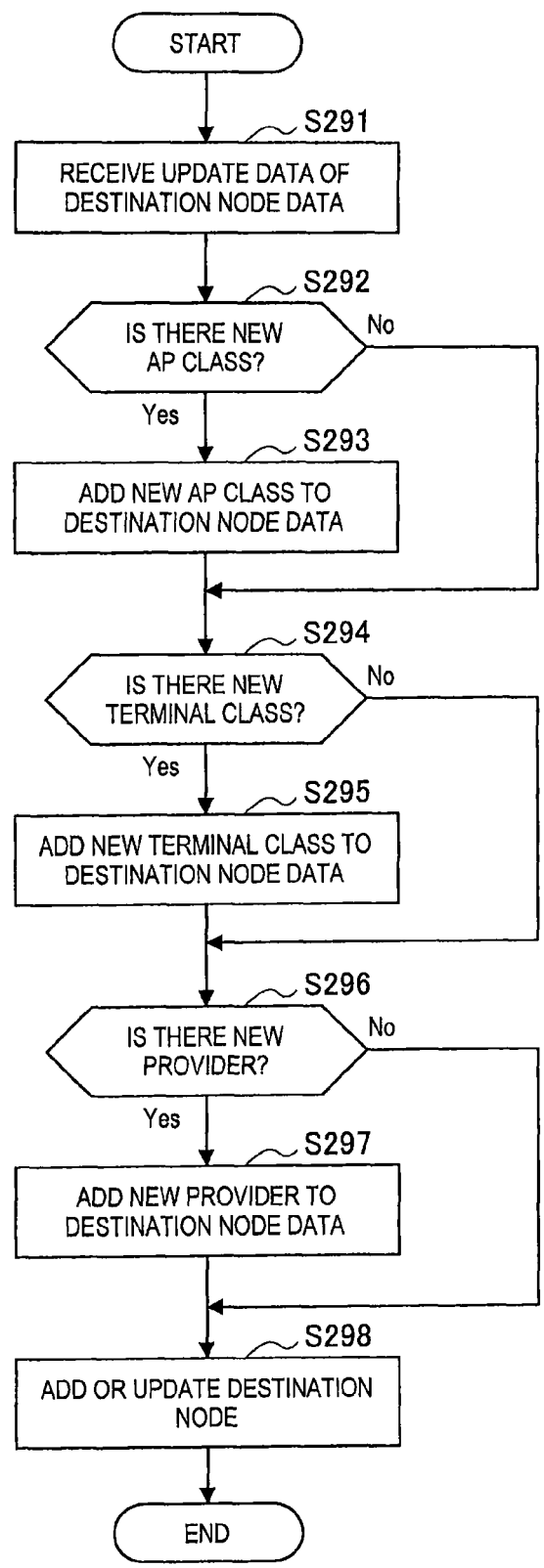
FIG. 24 is a flowchart illustrating an example of a flow of a destination node data update process in accordance with the second embodiment.

FIG. 24 is a flowchart illustrating an example of the flow of the destination node data update process by the intermediate node in accordance with this embodiment.

Referring to FIG. 24, first, the reception unit 142 of the communication device 240 receives update data of destination node data distributed from the information management server 270 (step S291). Next, the information management unit 254 determines whether there is a new AP class within the update data (step S292). Here, when there is a new AP class within the update data, the new AP class is added to the destination node data 251 illustrated in FIG. 18 (step S293). In addition, the information management unit 254 determines whether there is a new terminal class within the update data (step S294). Here, when there is a new terminal class within the update data, the new terminal class is added to the destination node data 251 (step S295). Further, the information management unit 254 determines whether the provider ID within the update data is a provider ID of a new provider (step S296). Here, when the provider ID within the update data is a provider ID of a new provider, the provider ID of the new provider is added to the destination node data 251 (step S297). The information management unit 254 adds (information such as an IP address or a host name of) a destination node corresponding to a combination of an AP class, a terminal class, and a provider ID within update data to the destination node data 251, or updates an existing destination node (step S298).

[2-7. Management of DRX]

Communication schedule information included in update data 283 illustrated in FIG. 22 can be further distributed from the intermediate node to each corresponding terminal device 200. Alternatively, the information management server 270 may distribute the communication schedule information separate from the update data 283 to each terminal device 200. Each terminal device 200 receiving the communication schedule information controls a sleep time of its own device according to the communication schedule information, and implements an intermittent operation (DRX: discontinuous reception).

The control of the intermittent operation of the terminal device 200 may be performed according to a simple parameter such as once daily ("every day") or once weekly ("every week") like the communication schedule information illustrated in FIG. 22. For example, when the parameter of once daily ("every day") has been designated, the wireless reception unit 122 and the wireless transmission unit 124 of the terminal device 200 wake up in an arbitrary time band only once daily, and transmit the above-described data packet to the AP server 190 by generating AP data in the time band. The communication schedule information may include information regarding a time band of the wake-up (for example, start and end times, a time length, or the like) in addition to a cycle of the intermittent operation.

In addition, in each terminal device 200, according to the base station 220 or another communication node, a cycle of a shorter auxiliary intermittent operation in the time band of the above-described wake-up may be determined. In this case, the wireless reception unit 122 and the wireless transmission unit 124 of the terminal device 200 can sleep, for example, except for the timing at which a communication resource for its own device has been scheduled, even in the designated wake-up time band. Thereby, power consumption of the terminal device 200 can be further reduced.

[2-8. Summary of Second Embodiment]

The second embodiment has been described above using FIGS. 10 to 24. In accordance with this embodiment, intermediate node designation information designating an intermediate node different from a destination node on a path to the destination node of a data packet is inserted into the destination field of a data packet transmitted from an MTC terminal. Thereby, traffic of MTC communication is not concentrated on a specific communication path, and bypasses to a path via the designated intermediate node. As a result, traffic is distributed and congestion of traffic in MTC communication is avoided or mitigated.

In addition, in accordance with this embodiment, a device that inserts the intermediate node designation information into the destination field may be a communication node (for example, a base station or the like) that receives a data packet from the MTC terminal. When the above-described communication node inserts the intermediate node designation information into the data packet, it is possible to introduce a technique of congestion avoidance in accordance with the above-described embodiment without giving impact such as modification of a processing logic to the MTC terminal.

In addition, in accordance with this embodiment, the designated intermediate node identifies an ultimate destination node of a data packet from control information regarding the MTC terminal inserted within the data packet or information transcribed to the reserved field. Accordingly, even when the destination field of the data packet has been changed, the data packet can be appropriately delivered to the ultimate destination node (for example, a corresponding AP server) via the intermediate node.

In this embodiment, because it is not necessary to transcribe information regarding a destination node to the reserved field when the destination node is identified using the control information regarding the MTC terminal, an existing packet format can be effectively utilized. On the other hand, because each intermediate node does not hold destination node data when the destination node is identified from information transcribed to the reserved field, it is possible to reduce processing costs necessary for referring to the destination node data or resources of a storage medium.

[2-9. Application Example]

In the second embodiment, an example in which a data packet transmitted from an MTC terminal is bypassed to a path via an intermediate node has been mainly described. However, a mechanism for setting the above-described intermediate node is also applicable to a data packet transmitted to the MTC terminal. For example, the communication device 140 illustrated in FIG. 10 may insert intermediate node designation information into the destination field of the data packet transmitted to the terminal device 200 according to a destination field update process illustrated in FIG. 15D or 15E, and transcribe information such as an address of the terminal device 200 described in the destination field to the reserved field.

A series of control processes by each device described in this specification may be implemented using one of software, hardware, and a combination of software and hardware. A program constituting the software, for example, is pre-stored in a storage medium provided inside or outside each device. Each program, for example, is read to a random access memory (RAM) during execution, and executed by a processor such as a central processing unit (CPU).

In addition, an example in which the terminal devices 100 and 200, which are MTC terminals, access a network according to wireless communication has been mainly described in this specification. However, the effects of the above-described two embodiments can be equally obtained even when the MTC terminals access the network according to wired communication.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1, 2 Communication system
10 Core network
20 Network
100, 200 Terminal device
120, 220 Base station
140 Communication device (forwarding node)
240 Communication device (intermediate node)
270 Information management server
190 AP server

The invention claimed is:

1. A communication device within a communication network including a plurality of communication nodes, comprising:
   circuitry configured to:
      receive a data packet transmitted from a terminal device or transmitted to the terminal device;
      select a forwarding destination node for the data packet from a plurality of forwarding destination node candidates when the terminal device is a machine-type communication (MTC) terminal, wherein the circuitry selects the forwarding destination node from the plurality of forwarding destination node candidates for different classifications of data packets based on control information within the data packet; and
      transmit the data packet to the forwarding destination node selected.

2. The communication device according to claim 1, wherein the circuitry is further configured to:
   store forwarding destination data in which classification of data packets is associated with forwarding destination nodes,
   classify the data packet according to the control information, and
   select a forwarding destination node associated with classification of the data packet in the forwarding destination data as the forwarding destination node for the data packet.

3. The communication device according to claim 1, wherein the control information includes a terminal identifier (ID), a class, or a group of the terminal device or an application ID or a class of an application relating to the data packet.

4. The communication device according to claim 1, wherein the circuitry is further configured to classify each data packet according to the control information, and selects a forwarding destination node of each data packet so that forwarding destinations of data packets belonging to a same classification are distributed to a plurality of forwarding destination nodes.

5. The communication device according to claim 1, wherein the circuitry is further configured to select the forwarding destination node for the data packet from the plurality of forwarding destination node candidates regardless of a routing metric relating to a path to a destination node of the data packet.

6. The communication device according to claim 1, wherein the circuitry inserts intermediate node designation information designating an intermediate node different from a destination node on a path to the destination node of the data packet into a destination field of the data packet.

7. The communication device according to claim 6, wherein the circuitry is further configured to transcribe information described in the destination field to another field upon receipt of the data packet.

8. The communication device according to claim 6, wherein the circuitry is further configured to add a flag indicating that the destination field is changed to the data packet.

9. The communication device according to claim 1, wherein the communication network is a core network of a cellular communication system.

10. A communication control method for use in a communication device within a communication network including a plurality of communication nodes, comprising:
   receiving, with circuitry of the communication device, a data packet transmitted from a terminal device or transmitted to the terminal device;
   selecting, with the circuitry, a forwarding destination node for the data packet from a plurality of forwarding destination node candidates when the terminal device is a machine-type communication (MTC) terminal, wherein the circuitry selects the forwarding destination node from the plurality of forwarding destination node candidates for different classifications of data packets based on control information within the data packet; and
   transmitting the data packet to the selected forwarding destination node.

11. A communication system comprising:
   a communication device including circuitry configured to:
      receive a data packet transmitted from a terminal device or transmitted to the terminal device;
      select a forwarding destination node for the data packet from a plurality of forwarding destination node candidates when the terminal device is a machine-type communication (MTC) terminal, wherein the circuitry selects the forwarding destination node from the plurality of forwarding destination node candidates for different classifications of data packets based on control information within the data packet; and
      transmit the data packet to the forwarding destination node selected; and
   a plurality of communication nodes that are the plurality of forwarding destination node candidates.

12. A communication device within a communication network including a plurality of communication nodes, comprising:
   circuitry configured to:
      receive a data packet transmitted from a terminal device or transmitted to the terminal device;
      insert control information into the data packet for use in classification of the data packet; and
      transmit the data packet to a communication node of the plurality of communication nodes that selects a forwarding destination node for the data packet from a plurality of forwarding destination node candidates when the terminal device is a machine-type communication (MTC) terminal, wherein the communication node selects the forwarding destination node from the plurality of forwarding destination node candidates for different classifications of data packets based on the control information within the data packet.

* * * * *